(12) United States Patent
Knight

(10) Patent No.: US 12,398,251 B2
(45) Date of Patent: Aug. 26, 2025

(54) WATER SOLUBLE UNIT DOSE FILM FOR PACKAGING HARSH CHEMICALS

(71) Applicant: MONOSOL, LLC, Merrillville, IN (US)

(72) Inventor: Jonathon Knight, Laporte, IN (US)

(73) Assignee: MONOSOL, LLC, Merrillville, IN (US)

(*) Notice: Subject to any disclaimer, the term of this patent is extended or adjusted under 35 U.S.C. 154(b) by 687 days.

(21) Appl. No.: 17/763,619

(22) PCT Filed: Sep. 30, 2020

(86) PCT No.: PCT/US2020/053608
§ 371 (c)(1),
(2) Date: Mar. 24, 2022

(87) PCT Pub. No.: WO2021/067482
PCT Pub. Date: Apr. 8, 2021

(65) Prior Publication Data
US 2022/0356314 A1    Nov. 10, 2022

Related U.S. Application Data

(60) Provisional application No. 62/908,581, filed on Sep. 30, 2019.

(51) Int. Cl.
*B65D 65/46* (2006.01)
*B65D 85/82* (2006.01)
(Continued)

(52) U.S. Cl.
CPC ............... *C08J 5/18* (2013.01); *B65D 65/46* (2013.01); *B65D 85/82* (2013.01); *B65D 85/84* (2013.01); *C08L 29/04* (2013.01); *C08J 2329/04* (2013.01)

(58) Field of Classification Search
CPC ...... C08J 2329/04; C08J 2439/06; C08J 5/18; C08J 2339/06; C08L 29/04; C08L 39/06;
(Continued)

(56) References Cited

U.S. PATENT DOCUMENTS 3,695,989 A * 10/1972 Albert ................. C08J 9/30
                                                521/149
3,892,905 A * 7/1975 Albert ................. C08L 29/04
                                                206/0.5
(Continued)

FOREIGN PATENT DOCUMENTS

CA   3078064 A1   4/2016
EP   1251147 A1   10/2002
(Continued)

OTHER PUBLICATIONS

Written Opinion of the International Searching Authority for International Applicaiton No. PCT/US2020/053608, issued Dec. 23, 2020.
(Continued)

*Primary Examiner* — Michael C Romanowski
(74) *Attorney, Agent, or Firm* — Benesch Friedlander Coplan & Aronoff LLP

(57) ABSTRACT

Disclosed herein are water-soluble films and/or water soluble unit dose articles comprising a water soluble mixture comprising a polyvinyl alcohol (PVOH) and a polyvinylpyrrolidone (PVP), and methods of making and using the same.

25 Claims, 6 Drawing Sheets

(51) Int. Cl.
*B65D 85/84* (2006.01)
*C08J 5/18* (2006.01)
*C08L 29/04* (2006.01)

(58) Field of Classification Search
CPC .... C09D 129/04; B65D 65/46; C08K 5/0016; C08K 5/005; C08K 5/053
USPC .............................................. 428/34.1–36.92
See application file for complete search history.

(56) References Cited

U.S. PATENT DOCUMENTS

| | | | | |
|---|---|---|---|---|
| 4,481,326 A | | 11/1984 | Sonenstein | |
| 4,544,693 A | * | 10/1985 | Surgant | C08L 29/04 524/375 |
| 4,656,216 A | * | 4/1987 | Muller | C08K 5/053 524/381 |
| 6,166,117 A | * | 12/2000 | Miyazaki | C11D 3/3955 525/61 |
| 9,670,440 B2 | * | 6/2017 | Bullock | C11D 3/3953 |
| 2004/0071755 A1 | * | 4/2004 | Fox | A61K 8/463 424/443 |
| 2004/0186034 A1 | * | 9/2004 | Verrall | C08F 8/44 510/296 |
| 2013/0340333 A1 | * | 12/2013 | Vialatte | C09K 17/40 524/321 |
| 2014/0110301 A1 | * | 4/2014 | Carrier | B65D 65/46 524/53 |
| 2016/0280869 A1 | * | 9/2016 | Nii | C08K 5/0016 |
| 2017/0226338 A1 | * | 8/2017 | Friedrich | C11D 17/042 |
| 2017/0233539 A1 | * | 8/2017 | Friedrich | C11D 17/042 510/296 |
| 2017/0275394 A1 | | 9/2017 | Mori et al. | |
| 2017/0298216 A1 | * | 10/2017 | Labeque | C08J 5/18 |
| 2018/0029763 A1 | * | 2/2018 | Nii | B65D 75/40 |
| 2020/0010783 A1 | * | 1/2020 | Karikari | C11D 17/042 |

FOREIGN PATENT DOCUMENTS

| | | | | |
|---|---|---|---|---|
| JP | 2017-082172 | * | 5/2017 | .............. C08L 29/04 |
| JP | 2017/082172 A | | 5/2017 | |
| RU | 2054369 C1 | | 2/1996 | |
| WO | 2002/060980 A2 | | 8/2002 | |
| WO | 2004/032859 A2 | | 4/2004 | |
| WO | 2016/061069 A2 | | 4/2016 | |
| WO | 2016061026 | | 4/2016 | |
| WO | 2016/150116 A1 | | 9/2016 | |
| WO | 2017180888 A1 | | 10/2017 | |
| WO | 2018026749 A1 | | 2/2018 | |
| WO | 2017180888 A | | 11/2018 | |

OTHER PUBLICATIONS

International Search Report for International Application No. PCT/US2020/053608, issued Dec. 23, 2020.
May 25, 2023 Notice of Reasons for Rejection issued by the Japanese Patent Office for Japanese Patent Application No. 2022-517392. [English translation included.]
Mar. 16, 2023 Office Action issued by the Canadian Intellectual Property Office for Canadian Patent Applicaiton No. 3,151,332.
Oct. 7, 2022 First Examination Report issued by the Indian Patent Office for Indian Patent Application No. 202217021189.
Aug. 4, 2022 Notification of Laying Open Publication issued by the China National Intellectual Property Association for Chinese Patent Application No. 202080068988.9. [English Abstract indluded].
Office Action issued in Chinese Patent Application No. 202080068988.9, dated Mar. 18, 20214.
Notice of Acceptance issued in Australian Patent Application No. 2020360405, dated Mar. 5, 2024.
Office Action and Search Report issued in Russian Patent Application No. 2022111616, dated Feb. 26, 2024.
Office Action issued Japanese Patent Application No. 2022-517392, Mailing Date, Dec. 12, 2023.
May 1, 2023 Examination Report No. 1 issued by the Australian Patent Office for Australian Patent Application No. 2020360405.

* cited by examiner

WATER SOLUBLE UNIT DOSE FILM FOR PACKAGING HARSH CHEMICALS

CROSS-REFERENCE TO RELATED APPLICATIONS

This application is a U.S. national stage application under 35 U.S.C. § 371 of International Application No. PCT/US2020/053608, filed Sep. 30, 2020, which claims the benefit under 35 U.S.C. § 119(e) of U.S. Provisional Patent Application No. 62/908,581, filed Sep. 30, 2019, the entire disclosures of which are hereby incorporated by reference.

FIELD OF THE INVENTION

The present disclosure relates generally to water-soluble films and related packets. More particularly, the disclosure relates to water-soluble films for packaging harsh chemical compositions.

BACKGROUND

Water-soluble polymeric films are commonly used as packaging materials to simplify dispersing, pouring, dissolving, and dosing of a material to be delivered. A consumer can directly add the pouched composition to a mixing vessel, such as a bucket, sink, or washing machine. Advantageously, this provides for accurate dosing while eliminating the need for the consumer to measure the composition. Additionally, the water-soluble polymeric film packaging can separate otherwise strong chemistries from the consumer's hand, protecting the consumer from coming in contact with harsh chemicals. The pouched composition may also reduce mess that would be associated with dispensing a similar composition from a vessel, such as pouring a composition from a bottle. In sum, soluble pre-measured polymeric film pouches provide for the convenience and safety of consumer use in a variety of applications.

Some water-soluble polymeric films that are used to make currently marketed pouches interact with the pouch components (e.g., oxidants, acids, bases or the like), which affects the properties of the pouch, for example the solubility of the film, particularly after storage. For example, pouches may demonstrate reduced film solubility over time when in contact with contents therein, such as chemicals commonly used in pool and spa applications. Such reduced solubility can, for example, result in significant amounts of residue remaining (e.g., greater than 50%) after the contents of the pouch have been dispersed. In another type of problem, the film may discolor. In another type of problem, the film may become less elastic and more brittle, resulting in premature breaking of the pouch or packet and release of the contents prior to use.

Thus, there exists a need in the art for water soluble film that is water soluble and can be formed into packages for holding harsh chemical compositions that can maintain acceptable elasticity, solubility, and resist discoloration.

SUMMARY

Provided herein are water soluble films and/or water soluble unit dose articles comprising a water soluble mixture of a polyvinyl alcohol (PVOH) and a polyvinylpyrrolidone (PVP), and methods of using the same.

One aspect of the disclosure provides a water soluble film comprising a water soluble mixture of a polyvinyl alcohol (PVOH) and a polyvinylpyrrolidone (PVP), wherein the PVOH and the PVP are present in a ratio of about 3:1 by weight to about 19:1 by weight, respectively, and the PVOH comprises an 2-acrylamide-2-methylpropanesulfonic acid (AMPS) modified PVOH or a maleate modified PVOH.

Another aspect of the disclosure provides a water-soluble unit dose article comprising a packet comprising an outer wall, the outer wall having an exterior surface and an interior surface defining an interior pouch volume, the outer wall comprising a water soluble film as described herein, and a composition contained in the interior pouch volume.

Another aspect of the disclosure provides a process for dosing a composition to bulk water comprising the steps of contacting with the bulk water a water soluble unit dose article as described here, thereby dissolving at least a portion of the water soluble film and releasing the composition to the bulk water.

Another aspect of the disclosure provides a water soluble unit dose article comprising a packet comprising an outer wall, the outer wall having an exterior surface and an interior surface defining an interior pouch volume, the outer wall comprising a water soluble film as described herein; and a household care composition contained in the interior pouch volume, wherein the household care composition has a pH of less than or equal to 2.

Another aspect of the disclosure provides a water soluble unit dose article comprising a packet comprising an outer wall, the outer wall having an exterior surface and an interior surface defining an interior pouch volume, the outer wall comprising a water soluble film; and a harsh chemical contained in the interior pouch volume, wherein the water soluble film comprises a 1 mol % to 4 mol % monomethyl maleate modified polyvinyl alcohol resin, a plasticizer, a surfactant, and an antioxidant, wherein, the plasticizer comprises glycerol and maltitol and is present in an amount of less than 20 PHR and the antioxidant comprises sodium metabisulfite and is present in an amount in a range of 2 PHR to 10 PHR.

BRIEF DESCRIPTION OF THE DRAWINGS

For further facilitating the understanding of the present disclosure, six figures are appended hereto.

DETAILED DESCRIPTION

Figure 1:
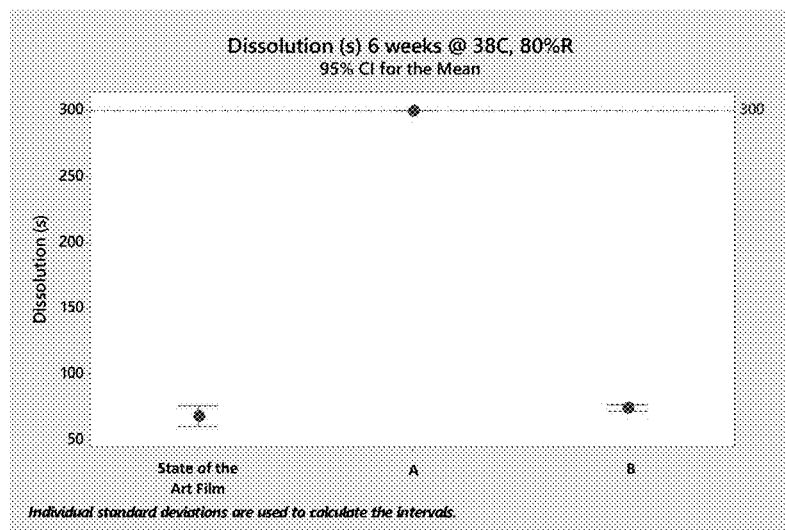
FIG. 1 is a chart of dissolution time(s) for various films after being exposed to a harsh chemical for 6 weeks in a 38° C. and 80% relative humidity (RH) atmosphere.

In the disclosure presented herein, one aspect provides a water soluble film comprising a water soluble mixture of a polyvinyl alcohol (PVOH) and a polyvinylpyrrolidone (PVP). In embodiments, the PVOH and the PVP are present in a ratio of about 3:1 by weight to about 19:1 by weight, respectively. In embodiments, the PVOH can comprise an AMPS modified PVOH or a maleate modified PVOH.

The water soluble films according to the disclosure can be designed to provide one or more advantages, for example, retention of desirable film properties in the presence of harsh chemicals, such as elasticity and solubility, resistance to degrading in the presence of harsh chemicals, and/or resistance to coloration.

Harsh chemicals include chemical species that are highly acidic or alkaline, compounds that have a positive standard electrode potential, and/or compounds that are very hygroscopic such that they will desiccate moisture containing materials. As used herein, and unless specified otherwise, a "maleate modified PVOH" refers to a polyvinyl alcohol including monomer units resulting from polymerization with monomers selected from the group consisting of maleic acid, monoalkyl maleate, dialkyl maleate, and/or maleic anhydride.

Another aspect of the disclosure provides a water soluble unit dose article comprising an outer wall, the outer wall having an exterior surface and an interior surface defining an interior pouch volume, the outer wall comprising a water soluble film as described herein, and a composition contained in the interior pouch volume. In embodiments, the composition can comprise a harsh chemical.

All percentages, parts and ratios referred to herein are based upon the total dry weight of the film composition or total weight of the packet content composition of the present disclosure, as the case may be, and all measurements made are at about 25° C., unless otherwise specified. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

It is expressly contemplated that for any number value described herein, e.g. as a parameter of the subject matter described or part of a range associated with the subject matter described, an alternative which forms part of the description is a functionally equivalent range surrounding the specific numerical value (e.g. for a dimension disclosed as "40 mm" an alternative embodiment contemplated is "about 40 mm").

As used herein, the terms packet(s) and pouch(es) should be considered interchangeable. In certain embodiments, the terms packet(s) and pouch(es), respectively, are used to refer to a container made using the film, and to a fully-sealed container preferably having a material sealed therein, e.g., in the form of a measured dose delivery system. The sealed pouches can be made from any suitable method, including such processes and features such as heat sealing, solvent welding, and adhesive sealing (e.g., with use of a water-soluble adhesive).

As used herein and unless specified otherwise, the terms "wt. %" and "wt %" are intended to refer to the composition of the identified element in "dry" (non-water) parts by weight of the entire film, including residual moisture in the film (when applicable, as describing a film), or parts by weight of the entire composition or coating, as the case may be depending on context.

As used herein and unless specified otherwise, the term "PHR" ("phr") is intended to refer to the composition of the identified element in parts per one hundred parts water-soluble polymer resin(s) (whether PVOH or other polymer resins, unless specified otherwise) in the water-soluble film, or a solution used to make the film.

The film can be made by any suitable method, including a solution casting method. Methods of forming containers from films are known in the art. The film can be used to form a container (pouch) by any suitable process, including vertical form, fill, and sealing (VFFS), or thermoforming. The film can be sealed by any suitable process including, for example, solvent sealing or heat sealing of film layers, e.g. around a periphery of a container. The pouches can be used for dosing materials to be delivered into bulk water, for example.

The film, pouches, and related methods of use are contemplated to include embodiments including any combination of one or more of the additional optional elements, features, and steps further described below, unless stated otherwise.

In any embodiment, the water-soluble pouch can contain (enclose) a composition. The composition can be selected from a liquid, solid, or combination thereof. As used herein, "liquid" includes free-flowing liquids, as well as pastes, gels, foams, and mousses. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls.

The water soluble films described herein can comprise a water soluble mixture including a PVOH and a PVP. The PVOH and PVP can be present in a ratio in of about 3:1 to about 19:1, by weight, respectively. In embodiments, the PVOH and PVP can be present in an ratio of about 3:1 by weight to about 19:1 by weight, respectively, or about 3:1 by weight to about 18:1 by weight, or about 5:1 by weight to about 18:1 by weight, or about 5:1 by weight to about 15:1 by weight, or about 6:1 by weight to about 15:1 by weight, or about 6.5:1 by weight to about 12:1 by weight, or about 6.5:1 by weight to about 10:1 by weight, or about 5:1 by weight to about 8:1 by weight, or about 5:1 by weight to about 7.5:1 by weight, or about 6.5:1 by weight to about 7.5:1 by weight. In embodiments, the PVOH and PVP are present in a ratio in a range of about 3:1 by weight to about 19:1 by weight, respectively, such as about 3:1, 4:1, 5:1, 5.5:1, 6:1, 6.5:1, 6.6:1, 6.7:1, 6.8:1, 7:1, 7.5:1, 8:1, 8.5:1, 9:1, 10:1, 11:1, 12:1, 13:1, 14:1, 15:1, 16:1, 17:1, 18:1, or 19:1 by weight. In embodiments, the PVOH and PVP can be present in a ratio of about 3:1 by weight to about 8:1 by weight, or about 3:1 by weight to about 7.5:1 by weight, or about 4.5:1 by weight to about 6:1 by weight. In embodiments, the PVOH and PVP can be present in a ratio of about 5:1 to about 8:1, by weight. In embodiments, the PVOH and PVP can be present in a ratio of about 6.5:1 to about 7.5:1. In embodiments, the PVOH and PVP can be present in a ratio of about 4:1 to about 7:1, by weight. In embodiments, the PVOH and PVP can be present in a ratio of about 5.5:1 to about 7:1, by weight.

As described herein, the combination of PVOH and PVP can advantageously provide resistance to degradation in the presence of harsh chemicals, such as acids, oxidants or bases. For example, when PVOH is used as the sole resin, the harsh chemical can react with the PVOH to degrade the film quickly. In contrast, it has been advantageously found that the combination of PVOH and PVP can stop or at least slow the degradation of the film. Without intending to be bound by theory, it is believed that the pyrrolidone functional groups of the PVP can act as an acid trap, interacting with $H^+$ ions from the harsh chemicals, preventing the $H^+$ ions from promoting acid catalyzed elimination of the hydroxyl units of the vinyl alcohol, thereby hindering degradation of the polyvinyl alcohol. Further, films including typical PVOH homopolymers or copolymers in contact with harsh chemicals can become brittle, as residual water and plasticizers migrate out of the film in the presence of the harsh chemicals, thus drying out the film and reducing mobility of the polymer chains making the film more vulnerable to breaking and premature release of the composition. In some cases, the harsh chemicals can be hygroscopic, which can result in the drawing out of and absorption of polar solvents and film components, such as commonly used plasticizers in water-soluble film formulations. The harsh chemical can absorb plasticizers such as glycerol, diglycerol, PEGs, or the like, from the water soluble films, resulting in brittle and/or poorly soluble films. However, advantageously, the combination of the PVOH copolymer and the PVP in a film inhibits the film from becoming brittle in the presence of harsh chemicals. Without intending to be bound by theory, it is believed that the presence of the PVP in the blend of PVP/PVOH copolymer films acts similar to a plasticizer, facilitating chain mobility, while migration of the PVP out of the film is hindered by the chain length and molecular weight, allowing the films to stay flexible even when the film has relatively low amounts of traditional plasticizer content.

In embodiments, in addition to the water-soluble resin mixture of the disclosure, the water soluble film can optionally include one or more additional agents such as surfactants, colorants, plasticizers, antioxidants, acid scavengers, or fillers, e.g. an acid scavenger and plasticizer; a surfactant, antioxidant, and plasticizer; or a surfactant, antioxidant, plasticizer, and filler(s), etc. An antioxidant, including but not limited to, sodium metabisulfite, gallic acid, or propyl gallate, can be added to the film to protect the film from oxidants. An acid scavenger, including but not limited to, N-vinyl pyrrolidone or sodium metabisulfite, can be added to improve the stability of the film in the presence of strong acids.

The water soluble films described herein generally includes a maleate modified polyvinyl alcohol (PVOH) or 2-acrylamide-2-methylpropanesulfonic acid (AMPS) modified PVOH. The water soluble films of the disclosure can further include one or more polyvinyl alcohol (PVOH) homopolymers, one or more polyvinyl alcohol copolymers, or a combination thereof. As used herein, the term "homopolymer" generally includes polymers having a single type of monomeric repeating unit (e.g., a polymeric chain consisting of or consisting essentially of a single monomeric repeating unit). For the particular case of PVOH, the term "homopolymer" (or "PVOH homopolymer") can include copolymers consisting of a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units.

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water-greater than about 140° F. (about 60° C.). If a sufficient number of acetate groups are allowed to remain after the hydrolysis of polyvinyl acetate, that is the PVOH homopolymer is partially hydrolyzed, then the polymer is more weakly hydrogen-bonded, less crystalline, and is generally soluble in cold water —less than about 50° F. (about 10° C.). As such, the partially hydrolyzed polymer is a vinyl alcohol-vinyl acetate copolymer, but is commonly referred to as PVOH homopolymer.

The viscosity of a PVOH homopolymer or copolymer (u) is determined by measuring a freshly made PVOH solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified in the disclosure in Centipoise (cPs) should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently can have a corresponding molecular weight distribution.

It is well known in the art that the viscosity of PVOH is correlated with the weight average molecular weight ($\overline{M}w$) of the PVOH resin, and often the viscosity is used as a proxy for the weight average molecular weight. In embodiments, the PVOH resin may have a viscosity of about 1.0 to about 50.0 cPs, about 1.0 to about 40.0 cPs, or about 1.0 to about 30.0 cPs, for example about 4 cPs, 8 cPs, 15 cPs, 18 cPs, 23 cPs, or 26 cPs. In embodiments, the PVOH may have a viscosity of about 1.0 to about 30.0 cPs for example, about 1 cPs, 1.5 cPs, 2 cPs, 2.5 cPs, 3 cPs, 3.5 cPs, 4 cPs, 4.5 cPs, 5 cPs, 5.5 cPs, 6 cPs, 6.5 cPs, 7 cPs, 7.5 cPs, 8 cPs, 8.5 cPs, 9 cPs, 9.5 cPs, 10 cPs, 11 cPs, 12 cPs, 13 cPs, 14 cPs, 15 cPs, 17.5 cPs, 18 cPs, 19 cPs, 20 cPs, 21 cPs, 22 cPs, 23 cPs, 24 cPs, 25 cPs, 26 cPs, 27 cPs, 28 cPs, 29 cPs, 30 cPs, 31 cPs, 32 cPs, 33 cPs, 34 cPs, or 35 cPs. In embodiments, the PVOH resin can have a viscosity of about 21-26 cPs. In embodiments, the PVOH resin can have a viscosity of about 5 cPs to about 14 cPs.

In embodiments, the PVOH of the water soluble films can have a degree of hydrolysis (DH) of at least about 70%, 80%, 84% or 85% and at most about 99.9%, for example in a range of about 70% to about 99.9%, about 75% to about 95%, about 85% to about 88%, about 88% to about 90%, about 84% to about 89%, about 85% to about 99.7%, about 85% to about 95%, about 87% to about 98%, about 89% to about 99%, or about 90% to about 99%, for example about 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%. In embodiments, the degree of hydrolysis of the PVOH is about 89% to about 93% or at least 96%. The DH, while specifically is a measure of the amount of acetates removed from the polyvinyl acetate polymer (e.g. via hydrolysis, saponification), it is most commonly used to understand the amount of acetate remaining on the PVOH polymer or copolymer. The acetate groups form the amorphous or non-crystalline regions of the PVOH copolymer. Therefore, it can be stated as an approximation, the higher the DH, the relatively higher is the crystallinity of the PVOH copolymer or blends of the PVOH copolymer. When a PVOH resin is described as having (or not having) a particular DH, unless specified otherwise, it is intended that the specified DH is the average DH for the PVOH resin.

Without being bound by theory, it is believed that as the degree of hydrolysis of a PVOH increases, the resistance to degradation by halogens of the PVOH and/or a film made therefrom increases. Further, without intending to be bound by theory, it is believed that as the degree of hydrolysis of a PVOH resin increases, the hydrogen bonding between different alcohol groups throughout the polymer chains of a film made therefrom increases, thereby, providing increased crystallinity which can inhibit harsh chemical penetration to the polymer backbone(s) and, ultimately, inhibit degradation of the polymer and/or the film made therefrom. However, for resins having a DH in a range of about 70% or more, in general, as the degree of hydrolysis increases, the cold water solubility of the resulting film decreases. Thus, the DH of a PVOH can be selected to provide a balance in intrinsic resistance to a harsh chemical and intrinsic solubility properties.

In embodiments, wherein the water-soluble resin mixture includes a maleate modified PVOH or an AMPS modified PVOH further comprise one or more different PVOH homopolymers and/or PVOH copolymers, the PVOH homopolymers and/or PVOH copolymers may differ in viscosity, in the degree of hydrolysis, or both.

The water-soluble resin mixture can include a PVOH copolymer which can be a PVOH terpolymer including vinyl alcohol monomer units, vinyl acetate monomer units (i.e., when not completely hydrolyzed), and a single type of anionic monomer unit (e.g., where a single type of monomer unit can include equivalent acid forms, salt forms, and optionally ester forms of the anionic monomer unit). In some aspects, the PVOH copolymer can include two or more types of anionic monomer units. General classes of anionic monomer units which can be used for the PVOH copolymer include the vinyl polymerization units corresponding to monocarboxylic acid vinyl monomers, the esters and anhydrides thereof, dicarboxylic monomers having a polymerizable double bond, the esters and anhydrides thereof, and alkali metal salts of any of the foregoing. Examples of suitable anionic monomer units include the vinyl polymerization units resulting from vinyl anionic monomers including but not limited to vinyl acetic acid, maleic acid, monoalkyl maleate, dialkyl maleate, maleic anhydride, fumaric acid, monoalkyl fumarate, dialkyl fumarate, itaconic acid, monoalkyl itaconate, dialkyl itaconate, itaconic anhydride, citraconic acid, monoalkyl citraconate, dialkyl citraconate, citraconic anhydride, mesaconic acid, monoalkyl mesaconate, dialkyl mesaconate, glutaconic acid, monoalkyl glutaconate, dialkyl glutaconate, glutaconic anhydride, (alkyl) acrylates, (methyl) acrylate, vinyl sulfonic acids, alkali metal salts of the foregoing, esters of the foregoing, and combinations of the foregoing. In embodiments, the anionic monomer unit can be selected from the group consisting of vinyl acetic acid, (alkyl) acrylates, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, itaconic acid, monomethyl itaconate, dimethyl itaconate, itaconic anhydride, citraconic acid, monoalkyl citraconate, dialkyl citraconate, citraconic anhydride, mesaconic acid, monoalkyl mesaconate, dialkyl mesaconate, glutaconic acid, monoalkyl glutaconate, dialkyl glutaconate, glutaconic anhydride, vinyl sulfonic acid, alkyl sulfonic acid, ethylene sulfonic acid, 2-acrylamido-1-methyl propane sulfonic acid, 2-acrylamide-2-methylpropanesulfonic acid (AMPS), 2-methylacrylamido-2-methylpropanesulfonic acid, 2-sulfoethyl acrylate, hydrolyzed N-vinylpyrrolidone, alkali metal salts of the foregoing, esters of the foregoing, and combinations of the foregoing. Specific types of PVOH copolymer resins include monomethyl maleate copolymers having a 1.5 to 4 mol % modification, a viscosity of about 16 to about 31 cPs and a degree of hydrolysis of about 88-100 and an AMPS copolymer having a 2-4 mol % modification, a viscosity in a range of 10-24 cPs, and a degree of hydrolysis of about 88-100.

When the water-soluble resin mixture comprises a PVOH copolymer, the degree of modification of the PVOH copolymer is not particularly limited. In embodiments, the PVOH copolymer can have a degree of modification in an amount in a range of about 1 mol. % to about 10 mol. %, about 1 mol. % to about 8 mol. %, about 1 mol % to about 5 mol %, about 2 mol. % to about 6 mol. %, about 3 mol. % to about 5 mol. %, or about 1 mol. % to about 3 mol. % (e.g., at least about 1.0, 1.5, 1.8, 2.0, 2.5, 3.0, 3.5, or 4.0 mol. % and up to about 3.0, 4.0, 4.5, 5.0, 6.0, 8.0, or 10 mol. % in various embodiments).

In general, the AMPS modified PVOH copolymer or the maleate modified PVOH copolymer, can be selected to provide one or more advantages. For example, the AMPS or maleate modified PVOH can provide improved resistance to harsh chemicals such as acids, oxidants, and bases that can cause damage to PVOH film. Without intending to be bound by theory, it is believed that the AMPS and/or maleate modifications can inhibit acid induced crosslinking of the PVOH, which can cause reduced solubility of the film in water and/or inhibit acid/base induced polyene formation (condensation reactions) that can cause the film to yellow undesirably. Further, the AMPS and maleate modifications can provide one or more advantages to the resulting film, for example, reduced crystalline regions in the film resulting in reduced dissolution time.

It is understood in the art that PVOH copolymers having pendant carboxyl groups, such as, for example, maleate modified PVOH, can form lactone rings between neighboring pendant carboxyl and alcohol groups, thus reducing the water solubility of the PVOH copolymer resin. In the presence of a strong base, the lactone rings can open over the course of several weeks at relatively warm (ambient) and high humidity conditions (e.g., via lactone ring-opening reactions to form the corresponding pendant carboxyl and alcohol groups with increased water solubility). Thus, it is believed that such a PVOH copolymer film can become more soluble due to chemical interactions between the film and an alkaline composition inside the pouch during storage. In embodiments, the maleate modified PVOH is substantially free of lactone rings, such that the modified PVOH has about 2 pendant carboxylate groups per maleate monomer unit. In embodiments, the maleate modified PVOH can comprise about 1.5 pendant carboxylate groups to 2 pendant carboxylate groups per maleate monomer unit, or about 1.2 pendant carboxylate groups to about 2 pendant carboxylate groups per maleate monomer unit, or about 1 pendant carboxylate groups to about 2 pendant carboxylate groups per maleate monomer unit, such as, about 2 pendant carboxylate groups per maleate monomer unit, or about 1.9 pendant carboxylate groups per maleate monomer unit, or about 1.8 pendant carboxylate groups per maleate monomer unit, or about 1.7 pendant carboxylate groups per maleate monomer unit, or about 1.6 pendant carboxylate groups per maleate monomer unit, or about 1.5 pendant carboxylate groups per maleate monomer unit, or about 1.2 pendant carboxylate groups per maleate monomer unit, or about 1 pendant carboxylate groups per maleate monomer unit.

As noted above, conventional water soluble PVOH films have a tendency to degrade in the presence of harsh chemicals, such as chlorinated sanitizing agents and other oxidative chemicals, acids, and certain bases. Excessive oxidation causes the films to become insoluble in water, thus making them ineffective for unit-dose packaging agents. Without intending to be bound by theory, it is believed that the hypochlorite ions produced by certain harsh chemicals oxidize the pendant-OH moieties in the PVOH copolymer film, creating carbonyl groups on the polymer backbone. The carbonyl group is an intermediate step toward polyene formation (and yellowing) as it creates an acidic alpha hydrogen. The carbonyl group is also an intermediate to chain scission. Additionally, hydrochloric acid produced by certain harsh chemicals may react with the hydroxyl group to create unsaturated bonds in the polymer backbone which can cause decreased solubility in water as well as discoloration in the film. In either event, the removal of the pendant-OH groups makes the films increasingly insoluble in water.

In embodiments, the water soluble mixture can comprise polyvinylpyrrolidone (PVP). Polyvinylpyrrolidone is a synthetic resin made from polymerizing the monomer N-vinylpyrrolidone. There have been many studies that have been devoted to the determination of the molecular weight of PVP polymer. The low molecular weight polymers have narrower distribution curves of molecular entities than the high molecular weight compounds. Some of the techniques for measuring the molecular weight of various PVP polymer products are based on measuring sedimentation, light scattering, osmometry, NMR spectroscopy, ebulliometry, and size exclusion chromatography for determining absolute molecular weight distribution. By the use of these methods, any one of three molecular weight parameters can be measured, namely the number average (Mn), viscosity average (Mv), and weight average ($\overline{M}w$). Each of these characteristics can yield a different answer for the same polymer. Therefore, in any review of the literature, one must know which molecular average is cited.

In embodiments, the polyvinylpyrrolidone can have a weight average molecular weight ($\overline{M}w$) of at least about 3,000 g/mol. In various embodiments, the PVP can have a $\overline{M}w$ in a range of about 3,000 g/mol to about 5 million g/mol. In some embodiments, the PVP can have a $\overline{M}w$ in a range of about 30,000 g/mol to about 5 million g/mol, or about 60,000 g/mol to 5 million g/mol, or about 80,000 g/mol to about 5 million g/mol, or about 100.00 g/mol to about 5 million g/mol, or about 150,000 g/mol to about 4 million g/mol, or about 200,000 g/mol to about 4 million g/mol, or about 500,000 g/mol to about 4 million g/mol, or about 1 million g/mol to about 3 million g/mol. In embodiments, the PVP can have a $\overline{M}w$ of about 1.2 million g/mol to about 3 million. In various embodiments, the PVP can have a $\overline{M}w$ in a range of about 3,000 g/mol to about 5 million g/mol, such as about 3,000 g/mol, 5,000 g/mol, 10,000 g/mol, 30,000 g/mol, 50,000 g/mol, 100,000 g/mol, 200,000 g/mol, 500,000 g/mol, 1 million g/mol, 2 million g/mol, 3 million g/mol, 4 million g/mol or 5 million g/mol. The weight average molecular weight can be determined by those skilled in the art, for example by methods such as size exclusion chromatography (gel permeation chromatography). When a PVP resin is described as having (or not having) a particular molecular weight, unless specified otherwise, it is intended that the specified molecular weight is the average molecular weight for the resin, which inherently has a corresponding molecular weight distribution.

Without intending to be bound by theory, it is believed that high Mw PVP polymers as disclosed herein are advantageous as they are resistant to migration out of the film when the film is in contact with dry and/or hygroscopic components. It is believed that the higher the Mw, the more entangled the individual polymer chains can become such that the PVP chains are less likely to separate from other components of the film and migrate out of the film.

The PVP polymer can provide a number of advantages when added to the water soluble film resin described herein. For example, without intending to be bound by theory, it is believed that the pyrrolidone functional groups of the PVP polymer can act as an acid trap, interacting with $H^+$ ions from the harsh chemicals (shown below in Scheme 1), thereby hindering acid induced cross-linking of the polyvinyl alcohol. Further, PVOH homopolymer or copolymer films in contact with harsh chemicals typically become brittle over time, as the harsh chemicals draw out water and/or plasticizers from the film. The harsh chemicals can be hygroscopic, which can result in the absorption other polar solvents and materials, such as commonly used as plasticizers in water-soluble film formulations. However, advantageously, the combination of the PVOH copolymer and the PVP in the film described herein can help prevent the film from becoming brittle in the presence of harsh chemicals. The PVP in the films described herein can act similar to a plasticizer but is resistant to being drawn out of the film by harsh chemicals. The PVP can also allow the films herein to maintain flexibility, even when the films include relatively low amounts of traditional plasticizer content and water content.

Scheme 1

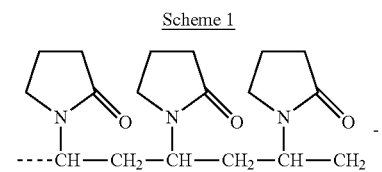

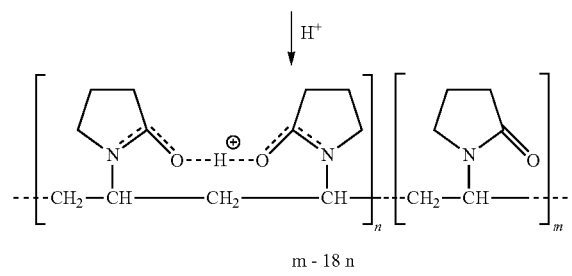

m - 18 n

In embodiments, a water soluble film as described herein that includes an AMPS modified PVOH copolymer or a maleate modified PVOH copolymer and PVP, and the combination can provide one or more advantages. For example, the AMPS or maleate modified PVOH blended with PVP in a water soluble film can offer improved resistance to harsh chemicals such as acids, oxidants, and bases that cause damage to the water soluble film. Further, the combination can provide a film having good long term storage properties as determined by exposing the film to a trichloroisocyanuric acid (TCCA) or sodium bisulfate (SBS) composition for 8 weeks in a 38° C. and 80% RH atmosphere. Such films can demonstrate a disintegration time of no more than 300 seconds according to MSTM 205 in 23° C. water; leave no more than 50% film residue, based on surface area of the starting film and the film after testing according to MS™-205 in 23° C. water, maintain an average elongation of at least 90%, and/or maintain a b* value of no more than 3.5. TCCA is considered one of the harshest oxidants in the art and is, therefore, a good proxy for all harsh chemicals. The 38° C. and 80% RH atmosphere was maintained by packaging the water-soluble films in contact with the harsh chemicals in a secondary packaging prepared from a 4 mil high density polyethylene (HDPE) film.

The water-soluble resin mixture can further include one or more water-soluble polymers including, but is not limited to, polyvinyl alcohols, water-soluble acrylate copolymers, polyethyleneimine, pullulan, water-soluble natural polymers including, but not limited to, guar gum, gum Acacia, xanthan gum, carrageenan, and starch, water-soluble polymer modified starches, copolymers of the foregoing, or a combination of any of the foregoing. Yet other water-soluble polymers can include polyalkylene oxides, polyacrylamides, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, or a combination of any of the foregoing. Such water-soluble polymers are commercially available from a variety of sources. In one type of embodiment, the type and/or amount of additional polymer(s) will not result in the water soluble film having less resistance to the harsh chemical.

In embodiments, the water soluble mixture can further include a second PVOH. The second PVOH can comprise a PVOH homopolymer, copolymer, or a combination thereof. In embodiments, the second PVOH can comprise a copolymer comprising an anionic monomer unit as described above. In embodiments, the second PVOH can comprise an anionic monomer unit selected from the group consisting of AMPS, hydrolyzed N-vinylpyrrolidone (NVP), maleic anhydride, monomethyl maleate, alkali salts thereof, and a combination thereof. In embodiments, the second PVOH can comprise an anionic monomer unit selected from the group consisting of monomethyl maleate, maleic anhydride, alkali salts thereof, and a combination thereof.

In embodiments, the water soluble film can comprise a 1 mol % to 4 mol % monomethyl maleate modified polyvinyl alcohol resin, a plasticizer, a surfactant, and an antioxidant. In embodiments, the water soluble film does not include polyvinylpyrrolidone. In embodiments, the plasticizer is present in an amount of less than 20 PHR, such 19 PHR, 18 PHR, 17 PHR, 16 PHR, 15 PHR, 14 PHR, 13 PHR, 12 PHR, 11 PHR, 10 PHR, or 5 PHR. In embodiments, the antioxidant is present in an amount in a range of 2 PHR to 10 PHR, such as 2 PHR, 3 PHR, 3.5 PHR, 4 PHR, 5 PHR, 6 PHR, 7 PHR, 8 PHR, 9 PHR, and 10 PHR. In embodiments, the plasticizer comprises glycerol and maltitol. In embodiments, the antioxidant comprises sodium metabisulfite. In embodiments, the antioxidant is sodium metabisulfite.

In embodiments, the water soluble film can comprise any suitable plasticizer. A plasticizer is a liquid, solid, or semisolid that is added to a material (usually a resin or elastomer) making that material softer, more flexible (by decreasing the glass-transition temperature of the polymer), or easier to process. In addition or in alternative, a polymer can be internally plasticized by chemically modifying the polymer or monomer. In embodiments, the water soluble film described herein can comprise one or more plasticizers. In embodiments, the plasticizer can comprise glycerol, diglycerin, sorbitol, ethylene glycol, diethylene glycol, triethylene glycol, dipropylene glycol, tetraethylene glycol, propylene glycol, polyethylene glycols up to 400 Da molecular weight, hexylene glycol, neopentyl glycol, trimethylolpropane, polyether polyols, polyether diol, polyether triol, xylitol, 2-methyl-1,3-propanediol (MPDiol®), ethanolamines, glycerol propylene oxide polymers (such as, for example, Voranol™ available from The Dow Chemical Company), or a mixture thereof. In embodiments herein, lower levels of low molecular weight polar plasticizers, such as glycerol and/or trimethylolpropane, are included as a means of maintaining flexibility and the ability to be converted into articles using standard equipment.

When the water soluble film includes a plasticizer, the plasticizer can be provided in a range of about 1 wt. % to about 45 wt. %, or about 5 wt. % to about 35 wt. %, or about 7.5 wt. % to about 30 wt. %, or about 8 wt. % to about 20 wt. %, or about 8 wt % to about 12 wt %, for example about 1 wt. %, 5 wt. %, 7.5 wt. %, 9 wt %, 10 wt. %, 15 wt. %, 17.5 wt % or 25 wt. %, based on total water soluble resin weight. The amount of plasticizer can also be characterized in PHR and the water soluble film can include a plasticizer in an amount of about 2 to about 75 PHR, about 3 to about 60 PHR, about 3 to about 50 PHR, about 4 to about 40 PHR, or about 2 to about 20 PHR. In embodiments, the plasticizer is provided in an amount of about 4 to about 40 PHR.

Without intending to be bound by theory, it is believed that the plasticizer can be selected to balance maintaining a flexible film and migration of active chemicals into the film matrix. Further, without intending to be bound by theory, it is believed that as the plasticization of the film increases, the ability of active chemicals to migrate into the film increases. Without intending to be bound by theory, it is believed that the closer the glass transition temperature of the film to the low end of the operating temperature range, the higher the resistance of the film to migration of chemicals into the film. Thus, the type and amount of plasticizer can be selected to provide a film having a glass transition temperature close to the low end of the operating temperature range. As used herein, the "operating temperature range" refers to the temperature at which the film will be exposed to during the life cycle of the film, for example, storage of the film and use of the film by consumers. In general, operating temperature ranges are not limited and can generally be in a range of about 0° C. to about 40° C., or about 5-10° C. to about 38-40° C.

In embodiments, the water soluble film herein can further include an acid scavenger, an antioxidant, or a combination thereof. The acid scavengers and/or antioxidants are believed to reduce or prevent damaging effects of a harsh chemical on a water soluble film in contact therewith, such as preventing or reducing the degradation of the water soluble film as described above, reduce or prevent yellowing of the water soluble film, and/or inhibit a change in the tensile strength of the films. Without intending to be bound by theory, the acid scavengers and/or antioxidants in the water soluble film can act as a trap by interacting with the harsh chemical before the PVOH or PVP reacts, in order to maintain the integrity of the film. Further without intending to be bound by theory it is believed that the inclusion of an acid scavenger or antioxidant would mitigate acid catalyzed hydrolysis and condensation reactions and help reduce the amount of acid in the film environment which can promote the oxidative activity of hypochlorite in the form of hypochlorous acid.

In embodiments, the acid scavenger can comprise one or more of N-vinyl pyrrolidone, sodium metabisulfite, activated olefins, maleate molecules (e.g., maleic acid and its derivatives), allylic compounds (e.g., allylic alcohols, allylic acetates, etc.), ethylene containing compounds, quaternary ammonium compounds, amines (e.g., pyridine, monoethanolamine, methylamine, aniline) and tertiary amine containing compounds. In embodiments, the acid scavenger comprises sodium metabisulfite. The acid scavenger can be included in the films described herein in an amount in a range of about 0.25 PHR to about 15 PHR, for example, about 0.25 PHR, about 0.5 PHR, about 0.75 PHR, about 1 PHR, about 1.5 PHR, about 2 PHR, about 2.5 PHR, about 3 PHR, about 3.5 PHR, about 4 PHR, about 5 PHR, about 5.5 PHR, about 6 PHR, about 6.5 PHR, about 7 PHR, about 8 PHR, about 9 PHR, about 10 PHR, or about 15 PHR. In embodiments, the acid scavenger is provided in the films described herein in an amount in a range of about 3 PHR to about 7 PHR.

In embodiments, the water soluble film can further include an antioxidant, for example, as a chloride scavenger. For example, suitable antioxidants/chloride scavengers include sulfite, bisulfite, thiosulfate, thiosulfate, iodide, nitrite, carbamate, ascorbate, and combinations thereof. In embodiments, the antioxidant is selected from propyl gallate (PGA), gallic acid, citric acid (CA), sodium metabisulfite (SMBS), carbamate, ascorbate, and combinations thereof. In embodiments, the antioxidant is selected from the group consisting of sodium metabisulfite, propyl gallate, gallic acid, phenolic compounds, hindered amines, citric acid, zinc acetate, and combinations thereof. In embodiments, the antioxidant can comprise propyl gallate. In embodiments, the antioxidant can comprise gallic acid. In embodiments, the antioxidant can comprise propyl gallate and gallic acid. The antioxidant can be included in the film in an amount in a range of about 0.25 to about 10 PHR, for example, about 0.25 PHR, about 0.5 PHR, about 0.75 PHR, about 1 PHR, about 1.5 PHR, about 2 PHR, about 2.5 PHR, about 3 PHR, about 3.5 PHR, about 4 PHR, about 5 PHR, about 5.5 PHR, about 6 PHR, about 6.5 PHR, about 7 PHR, about 8 PHR, about 9 PHR, or about 10 PHR. In embodiments, the antioxidant is provided in the film in an amount in a range of about 2 to about 7 PHR.

In embodiments, the water soluble film can include one or more acid scavengers and one or more antioxidants. In embodiments, the one or more acid scavengers can include sodium metabisulfite and the one or more antioxidants can include propyl gallate. In embodiments, the one or more acid scavengers can include sodium metabisulfite and the one or more antioxidants can include gallic acid. In embodiments, the one or more acid scavengers can include sodium metabisulfite and the one or more antioxidants can include propyl gallate and gallic acid. The total amount of antioxidant and acid scavenger included in the films herein can be in a range of about 1 PHR to about 20 PHR, for example, about 1 PHR, about 1.5 PHR, about 2 PHR, about 2.5 PHR, about 3 PHR, about 3.5 PHR, about 4 PHR, about 5 PHR, about 5.5 PHR, about 6 PHR, about 6.5 PHR, about 7 PHR, about 8 PHR, about 9 PHR, about 10 PHR, about 12 PHR, about 15 PHR, or about 20 PHR.

The water soluble film can further contain other auxiliary agents and processing agents, such as, but not limited to, surfactants, lubricants, release agents, fillers, extenders, cross-linking agents, antiblocking agents, detackifying agents, antifoams (defoamers), nanoparticles such as layered silicate-type nanoclays (e.g., sodium montmorillonite), bleaching agents (e.g., sodium metabisulfite, sodium bisulfate (SBS) or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. In embodiments, the water soluble film may include a filler, a surfactant, an anti-block agent, or combinations of the foregoing.

Surfactants for use in water-soluble films are well known in the art. Optionally, surfactants are included to aid in the dispersion of the resin solution upon casting. Suitable surfactants for water-soluble films of the present disclosure include, but are not limited to, dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof and combinations of any of the forgoing. Too little surfactant can sometimes result in a film having holes, whereas too much surfactant can result in the film having a greasy or oily feel from excess surfactant present on the surface of the film. Thus, surfactants can be included in the water-soluble films in an amount of less than about 2 phr, for example less than about 1 phr, or less than about 0.8 phr, for example.

In particular embodiments, the surfactant used in the water soluble films can be a quaternary ammonium surfactant or other surfactant that is basic and includes hindered amine character, and can advantageously provide antioxidant protection from the harsh chemical. For example, myristyl (C14) dimethylamine oxide, dioctyldimethyl ammonium chloride salts, or a combination thereof can provide the film with advantageous antioxidant protection.

One type of secondary component contemplated for use is a defoamer. Defoamers can aid in coalescing of foam bubbles. Suitable defoamers for use in water-soluble films according to the present disclosure include, but are not limited to, hydrophobic silicas, for example silicon dioxide or fumed silica in fine particle sizes, including Foam Blast® defoamers available from Emerald Performance Materials, including Foam Blast® 327, Foam Blast® UVD, Foam Blast® 163, Foam Blast® 269, Foam Blast® 338, Foam Blast® 290, Foam Blast® 332, Foam Blast® 349, Foam Blast® 550 and Foam Blast® 339, which are proprietary, non-mineral oil defoamers. For example, the water soluble film herein comprises Foam Blast® 338. In embodiments, defoamers can be used in an amount of 0.5 phr, or less, for example, 0.05 phr, 0.04 phr, 0.03 phr, 0.02 phr, or 0.01 phr.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc, mica, stearic acid and metal salts thereof, for example, magnesium stearate. Preferred materials are starches, modified starches and silica, for example, high amylose starch, amorphous silica, hydroxyethylated starch, or a combination thereof. In one type of embodiment, the amount of filler/extender/antiblocking agent/detackifying agent in the water soluble film can be in a range of about 0 wt % to about 10 wt %, or about 0 wt. % to about 8 wt. %, or about 0 wt. % to about 7.5 wt. %, or about 0 PHR to about 10 PHR, or about 1 PHR to about 8 PHR, or about 2 PHR to about 8 PHR, for example.

Aversive agents may be incorporated within the water soluble film or may be applied as a coating to the water soluble film. The aversive agent may be added in an amount to cause an aversive response such as bitterness diluted from its commercial form or otherwise mixed with a solvent for ease in mixing with other water soluble film components or applying as a coating to the water soluble film. Such solvents may be selected from water, lower molecular weight alcohols (methanol, ethanol, etc.) or plasticizers disclosed herein.

An anti-block agent (e.g. $SiO_2$ and/or stearic acid) can be present in the film in an amount of at least 0.1 PHR, or at least 0.5 PHR, or at least 1 PHR, or in a range of about 0.1 to 5.0 PHR, or about 0.1 to about 3.0 PHR, or about 0.4 to 1.0 PHR, or about 0.5 to about 0.9 PHR, or about 0.5 to about 2 PHR, or about 0.5 to about 1.5 PHR, or 0.1 to 1.2 PHR, or 0.1 to 2.7 PHR, for example 0.5 PHR, 0.6 PHR, 0.7 PHR, 0.8 PHR, or 0.9 PHR.

A suitable median particle size for the anti-block agent includes a median size in a range of about 3 or about 4 microns to about 11 microns, or about 4 to about 8 microns, or about 5 to about 6 microns, for example 5, 6, 7, 8, or 8 microns. A suitable $SiO_2$ is an untreated synthetic amorphous silica designed for use in aqueous systems.

The water soluble film described herein can have any suitable thickness. In embodiments, the water soluble film can have a thickness in a range of 15 µm to 150 µm, or 25 µm to 100 µm, or 30 µm to 70 µm, or 40 µm to 60 µm. For example, the water soluble film can have a thickness of 40 µm, 45 µm, 50 µm, 51 µm, 60 µm, 76 µm, or 88 µm. In embodiments, the water-soluble film has a thickness in a range of about 25 µm to about 100 µm. In embodiments, the water-soluble film has a thickness in a range of about 30 µm to about 70 µm. In embodiments, the water-soluble film has a thickness of about 50 micron.

Further provided herein is a water soluble unit dose article comprising a packet comprising an outer wall, the outer wall having an exterior surface and an interior surface defining an interior pouch volume, the outer wall comprising a water soluble film according to the disclosure herein and a composition contained in the interior pouch volume. In embodiments, the composition can comprise a harsh chemical. In embodiments, the harsh chemical can comprise an acid, an oxidant, a base, or a composition thereof. In embodiments, the harsh chemical can comprise an acid. In embodiments, the harsh chemical can comprise an oxidant. In embodiments, the harsh chemical can comprise a base.

In embodiments, the harsh chemical can comprise one or more of a hypochlorite, hypochlorous acid, a halogenated isocyanurate, a chlorate, a chlorite, a perchlorate, a bromate, a perbromate, a halogenated hydantoin, a perborate, a periodate, a persulfate, a permanganate, a chromate, a dichromate, a nitrate, a nitrite, a peroxide, a ketone peroxide, a peroxy acid, citric acid, muriatic acid, and an inorganic acid, such as, one or more of sodium bisulfate (SBS), cyanuric acid, dichloroisocyanuric acid, trichloroisocyanuric acid (TCCA), and calcium hypochlorite. In embodiments, the compositions can be both an acid and an oxidant, such as trichloroisocyanuric acid.

In embodiments, the harsh chemical can include a chlorine liberating compound. In embodiments, the acid, oxidant, base, or a combination thereof can comprise a chlorine liberating compound. As used herein, the term "chlorine liberating compound" refers to a family of chemicals that release chlorine or chloride upon contact with water. Chlorine liberating compounds are commonly used as bleaching materials, water disinfectants, medical equipment disinfectants as well as other disinfectant purposes.

In one embodiment, for instance, the oxidant may comprise a hypochlorite, a halogenated isocyanurate, such as sodium dichloroisocyanurate, trichloroisocyanuric acid a chlorate, a chlorite, a perchlorate, a bromate, a perbromate, a halogenated hydantoin, a perborate, a periodate, a persulfate, a permanganate, a chromate, a dichromate, a nitrate, a nitrite, a peroxide, a ketone peroxide, a peroxy acid, an inorganic acid, or a combination thereof. In embodiments, the oxidant comprises trichloroisocyanuric acid. In embodiments, the oxidant can include triisocyanuric acid (TCCA), diisocyanuric acid (DCCA), 1-Bromo-3-chloro-5,5-dimethylhydantoin (BCDMH), calcium hypochlorite (Cal-Hypo), potassium peroxymonosulfate (MPS). In embodiments, the oxidant can react with PVOH in various acid-mediated pathways, such as those shown in Scheme 2.

Scheme 2-Two Acid-mediated Oxidation Pathways of PVOH

1. Condensation Reaction

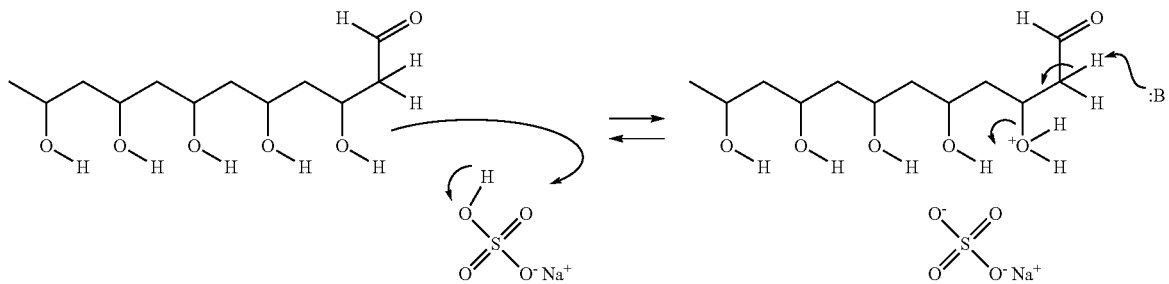

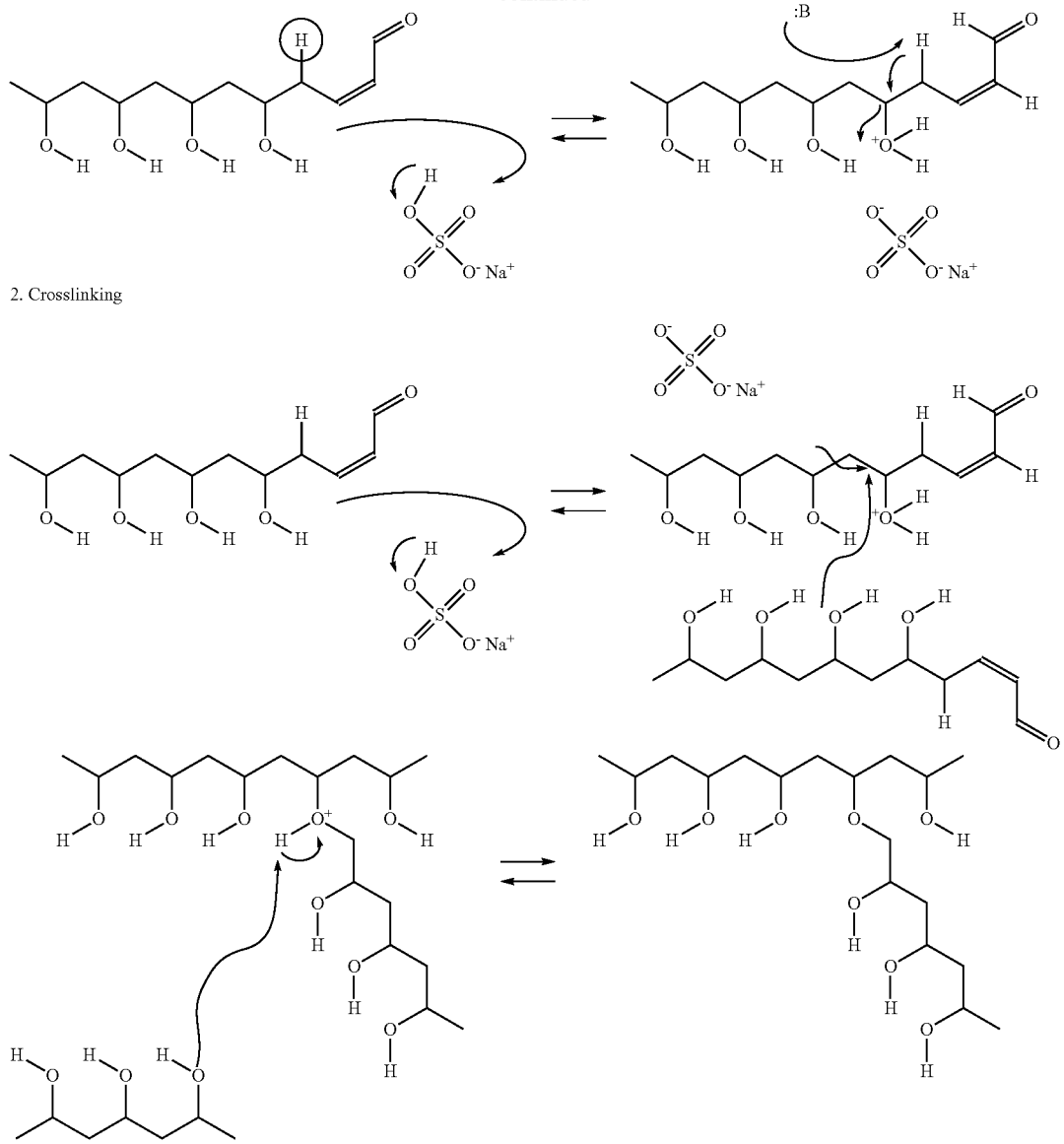

2. Crosslinking

In embodiments, the acid can comprise acids that have a pH in a range of −2 to 6.5 in a 1% water solution, or −1 to 6 in a 1% water solution, or 0 to 5 in a 1% water solution, or 1 to 5 in a 1% water solution, or 1 to 4 in a 1% water solution. In embodiments, the acid can comprise sodium bisulfate, cyanuric acid, dichloroisocyanuric acid, trichloroisocyanuric acid, or a combination thereof.

In embodiments, the water soluble unit dose article can comprise a non-household care composition. The non-household care composition can be selected from agricultural compositions, aviation compositions, food and nutritive compositions, industrial compositions, livestock compositions, marine compositions, medical compositions, mercantile compositions, military and quasi-military compositions, office compositions, recreational and park compositions, pet compositions, a pool and/or water-treatment composition, and a combination thereof. In embodiments, the non-household care composition is a pool and/or water-treatment composition.

In embodiments, the water soluble unit dose article can comprise a household care composition. In embodiments, the household care composition can comprise one or more acids used to adjust the pH of a solution to an acidic pH. In embodiments, the household care composition can comprise one or more acids, including but not limited to, glycolic acid, citrates, acetic acids, hydrochloric acid, levulinic acid, gluconic acids, or the like. In embodiments, the household care composition can have a pH of less than or equal to 3. In embodiments, the household care composition can have a pH of less than or equal to 2.5. In embodiments, the household care composition can have a pH of less than or equal to 2. In embodiments, the household care composition can have a pH of less than or equal to 1.5.

In embodiments, the water soluble unit dose article can comprise a concentration of acid, oxidant, base, or combination thereof in a range of 50 wt % to 100 wt %, or 60 wt % to 100 wt %, or 70 wt % to 100 wt %, or 80 wt % to 100 wt %, or 90 wt % to 100 wt %, based on the total weight of the composition. In embodiments, the concentration of acid, oxidant, base, or combination thereof in the non-household care composition of the water soluble unit dose article is in a range of 50 wt % to 100 wt %, or 60 wt % to 100 wt %, or 70 wt % to 100 wt %, or 80 wt % to 100 wt %, or 90 wt % to 100 wt %, based on the total weight of the non-household care composition.

In embodiments, the water soluble unit dose articles of the disclosure have a disintegration time of no more than 300 seconds according to MSTM 205 in 23° C. water after exposure to a TCCA, SBS, or calcium hypochlorite composition for 6 or 8 weeks in a 38° C. and 80% RH atmosphere.

In embodiments, the surface area of the residue of the water soluble unit dose article after testing according to MSTM 205 in 23° C. water after exposure to a TCCA, SBS, or calcium hypochlorite composition for 6 or 8 weeks in a 38° C. and 80% RH atmosphere is less than about 50% of the surface area of the water soluble unit dose prior to testing according to MSTM 205.

In embodiments, the water soluble unit dose article maintains a b* value of no more than 3.5, or no more than 3.0, or no more than 2.5 after exposure to TCCA, SBS, or calcium hypochlorite composition for 6 or 8 weeks in a 38° C. and 80% RH atmosphere according to the CIELab Test described herein. In embodiments, the water soluble unit dose article maintains a b* value of no more than 3.5 after exposure to TCCA, SBS, or calcium hypochlorite composition for 6 or 8 weeks in a 38° C. and 80% RH atmosphere. In embodiments, the water soluble unit dose article maintains a b* value of no more than 3.0 after exposure to TCCA, SBS, or calcium hypochlorite composition for 6 or 8 weeks in a 38° C. and 80% RH atmosphere. In embodiments, the water soluble unit dose article maintains a b* value of no more than 2.5 after exposure to TCCA, SBS, or calcium hypochlorite composition for 6 or 8 weeks in a 38° C. and 80% RH atmosphere.

In embodiments, the water soluble unit dose article maintains an average elongation of at least 90%, or at least 100%, or at least 120%, or at least 150%, or at least 175%, or at least 200%, after exposure to a TCCA or SBS composition for 8 weeks in a 38° C. and 80% RH atmosphere according to the Elongation Test described herein. In embodiments, the water soluble unit dose article maintains an average elongation of at least 100% after exposure to a TCCA or SBS composition for 8 weeks in a 38° C. and 80% RH atmosphere. In embodiments, the water soluble unit dose article maintains an average elongation of at least 120% after exposure to a TCCA or SBS composition for 8 weeks in a 38° C. and 80% RH atmosphere. In embodiments, the water soluble unit dose article maintains an average elongation of at least 150% after exposure to a TCCA or SBS composition for 8 weeks in a 38° C. and 80% RH atmosphere. In embodiments, the water soluble unit dose article maintains an average elongation of at least 175% after exposure to a TCCA or SBS composition for 8 weeks in a 38° C. and 80% RH atmosphere. In embodiments, the water soluble unit dose article maintains an average elongation of at least 200% after exposure to a TCCA or SBS composition for 8 weeks in a 38° C. and 80% RH atmosphere.

In embodiments, the water soluble unit dose article described herein can comprise the packet further comprising a first layer comprising an acid scavenger, an antioxidant, or a combination thereof, the first layer being in contact with the outer wall. In embodiments, the first layer comprises an acid scavenger, an antioxidant, or a combination thereof, and is provided on at least a portion of the interior surface of the outer wall. In embodiments, the first layer is provided on at least 90% of the interior surface of the outer wall. In embodiments, the first layer is provided on at least a portion of the exterior surface of the outer wall. In embodiments, the first layer comprises an acid scavenger. In embodiments, the first layer comprises an antioxidant. In embodiments, the first layer comprises an acid scavenger and an antioxidant.

The first and/or second layer of the water soluble unit dose article described herein can be provided on the outer wall using any suitable method known in the art, for example, solution coating such as, spin coating, dip coating, brush coating, spray coating.

The water soluble unit dose article can further comprise a second layer comprising an acid scavenger and/or an antioxidant. In embodiments, the first layer comprises an acid scavenger and/or an antioxidant, and is provided on at least a portion of the interior surface of the outer wall and the second layer comprises an acid scavenger and/or antioxidant, and is provided on at least a portion of the exterior surface of the outer wall. In embodiments, the first layer and/or the second layer can comprise an acid scavenger comprising N-vinyl pyrrolidone, sodium metabisulfite, activated olefins, allylic compounds, carboxylate compounds, ethylene containing compounds, quaternary ammonium compounds, tertiary amine containing compounds, or a combination thereof. In embodiments, the acid scavenger comprises propyl gallate, gallic acid, phenolic compounds, hindered amines, sodium metabisulfite, zinc acetate, or a combination thereof.

In embodiments, the water soluble unit dose article can be provided in any dimension suitable to fit through the neck of a trigger spray bottle (e.g., a spray bottle with a screw top neck having about a 28 mm diameter). In embodiments, the water soluble unit dose article can have a length of about 250 mm or less, or in a range of about 5 mm to about 250 mm, about 10 mm to about 250 mm, about 25 mm to about 250 mm, about 50 mm to about 225 mm, about 100 mm to about 225 mm, about 150 to about 225 mm, about 175 mm to about 225 mm, or about 200 mm. In embodiments, the water soluble unit dose article can have a width of about 50 mm or less, or in a range of about 2 mm to about 50 mm, about 5 mm to about 45 mm, about 10 mm to about 40 mm, about 15 mm to about 35 mm, or about 20 mm to about 30 mm. In embodiments, the water soluble unit dose article can have a length of about 175 mm to about 225 mm, or about 200 mm and a width of about 20 mm to about 30 mm, or about 25 mm. In embodiments, wherein the water soluble unit dose article is provided to fit through the neck of a trigger spray bottle, the water soluble unit dose article comprises a household care composition having a pH of less than or equal to 2.

In embodiments, the water soluble unit dose article can be heat sealed or solution sealed. In embodiments, the water soluble unit dose articles can be heat sealed on three sides. In embodiments, the water soluble film can be folded over onto itself and sealed on the edge opposite the fold and along one of the two remaining open edges with a heat impulse sealer, to provide a pouch of desired dimensions. A liquid composition (e.g., the household care composition) can be filled into the pouch using an injection system such as a pump or a syringe. In embodiments, the water soluble film can be stretched over a cavity of a specified dimension and heat and a vacuum can be applied to form the film into the shape of the cavity. The cavity can be then filled with the desired composition (e.g., a household care composition). The filled pouch can then be sealed with a second film. The second film can be pulled over the top of the cavity, and the side of the second film facing the filled pouch can be wetted for solution sealing. Pressure can be applied and the filled pouch can be bonded to the second film to form an encapsulated water soluble unit dose article. The solution sealing can be achieved using a cloud sample machine or the like.

Further provided herein is a process for dosing a composition of bulk water comprising the steps of contacting with bulk water a water soluble unit dose article as described herein, thereby dissolving at least a portion of the water soluble film, and releasing the composition to the bulk water. In embodiments, the water soluble unit dose article comprises a packet comprising an outer wall, the outer wall having an exterior surface and an interior surface defining an interior pouch volume, the outer wall comprising a water soluble film, wherein the water soluble film can comprise a water soluble mixture of an AMPS modified PVOH or a maleate modified PVOH and a PVP. In embodiments, the AMPS modified PVOH or the maleate modified PVOH and the PVP are present in a ratio of about 3:1 by weight to about 19:1 by weight, respectively.

In general, the bulk water can be any bulk water which requires a non-household care composition provided therein. In embodiments, the bulk water can be a pool or a spa. In general, the temperature of the bulk water can be any temperature sufficient to dissolve or disintegrate at least a portion of the water-soluble film. In embodiments, the bulk water has a temperature of at least about 10° C., for example, in a range of about 10° C. to about 100° C., about 10° C. to about 70° C., about 10° C. to about 60° C., about 20° C. to about 50° C., or about 20° C. to about 40° C. In general, the bulk water can have any pH. In embodiments, the pH of the bulk water can be in a range of about 4 to about 10, about 5 to about 9, or about 6 to about 7.

Elongation Test

Elongation at break can be analyzed according to ASTM D 882. Briefly, an INSTRON® tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. 1"-wide (2.54 cm) samples of a single film sheet having a thickness of 3.0±0.15 mil (or 76.2±3.8 μm) are prepared. The sample is then transferred to the INSTRON® tensile testing machine to proceed with testing. The tensile testing machine is prepared according to manufacturer instructions, equipped with a 500 N load cell, and calibrated. The correct grips and faces are fitted (INSTRON® grips having model number 2702-032 faces, which are rubber coated and 25 mm wide, or equivalent). The samples are mounted into the tensile testing machine pulled at a rate of 508 mm/minute until a 10% drop in tensile stress. The elongation at which the 10% drop in tensile stress occurs is the elongation at break.

Suitable behavior of films according to the disclosure is marked by elongation values of at least about 90% as measured by the INSTRON® testing machine. In various embodiments, the film has an elongation value of at least 90%, at least 100%, at least 120%, at least 150%, at least 175%, or at least 200% after exposure to a TCCA or SBS composition for 8 weeks in a 38° C. and 80% RH atmosphere.

Dissolution, Disintegration, and % Residue Test (MSTM 205)

A film can be characterized by or tested for Dissolution Time and Disintegration Time according to the MonoSol Test Method 205 (MSTM 205), a method known in the art. See, for example, U.S. Pat. No. 7,022,656.

Apparatus and Materials:

600 ml Beaker

Magnetic Stirrer (Labline Model No. 1250 or equivalent)

Magnetic Stirring Rod (5 cm)

Thermometer (0 to 100° C.±1° C.)

Template, Stainless Steel (3.8 cm×3.2 cm)

Timer (0-300 seconds, accurate to the nearest second)

Polaroid 35 mm slide Mount (or equivalent)

MonoSol 35 mm Slide Mount Holder (or equivalent)

Distilled water

For each film to be tested, three test specimens are cut from a film sample that is a 3.8 cm×3.2 cm specimen. If cut from a film web, specimens should be cut from areas of web evenly spaced along the traverse direction of the web. Each test specimen is then analyzed using the following procedure.

Lock each specimen in a separate 35 mm slide mount.

Fill beaker with 500 mL of distilled water. Measure water temperature with thermometer and, if necessary, heat or cool water to maintain temperature at 20° C. (about 68° F.).

Mark height of column of water. Place magnetic stirrer on base of holder. Place beaker on magnetic stirrer, add magnetic stirring rod to beaker, turn on stirrer, and adjust stir speed until a vortex develops which is approximately one-fifth the height of the water column. Mark depth of vortex.

Secure the 35 mm slide mount in the alligator clamp of the 35 mm slide mount holder such that the long end of the slide mount is parallel to the water surface. The depth adjuster of the holder should be set so that when dropped, the end of the clamp will be 0.6 cm below the surface of the water. One of the short sides of the slide mount should be next to the side of the beaker with the other positioned directly over the center of the stirring rod such that the film surface is perpendicular to the flow of the water.

In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

After 300 seconds, if any film residue remained in the frame, the percent of surface area of the film remaining was estimated by visual inspection.

The results should include the following: complete sample identification; individual and average disintegration and dissolution times; and water temperature at which the samples were tested.

Film disintegration times (I) and film dissolution times (I) can be corrected to a standard or reference film thickness using the exponential algorithms shown below in Equation 1 and Equation 2, respectively.

$$I_{corrected} = I_{measured} \times (\text{reference thickness/measured thickness})^{1.93} \quad [1]$$

$$S_{corrected} = S_{measured} \times (\text{reference thickness/measured thickness})^{1.83} \quad [2]$$

CIELab Test

The CIELab Test is used to determine the reference yellowness of a sample using a Ci7600 Spectrophotometer or equivalent.

Equipment and Material(s) Required
- X-Rite Ci7600 Benchtop Spectrophotometer
- X-Rite Color Master Software
- Black Trap, for reflectance calibration
- Aperture Plate, with white ring
- Sample Holder
- Transmission Plaque, to cover reflectance aperture plate when completing transmission measurements
- White Calibration Tile, to cover reflectance aperture plate when completing calibration
- Scissors, for cutting out film samples Calibration of the Ci7600 Spectrophotometer Note the aperture plates with a white ring on the inside MUST be used for transmission measurements. Open the Color Master software found on the desktop. In the Color Master software, go to the "Instrument" tab. Click Calibrate. Place the white calibration tile over the aperture plate. The UV setting should be set to EXC400. Close the transmission cover by lifting up on the locking pin while sliding the cover to the front. Note: You should hear the pin click into place. Click "OK" in the software calibration prompt. Remove the tile from the aperture plate. Take out the black trap from the accessory drawer and position it onto the aperture plate. Make sure the transmission cover is still closed and click "OK" in the software calibration prompt. Remove the black trap from the aperture plate. Place the transmission plaque over the aperture plate. Once the calibration process is successful, the calibration LED should be green.

Creating a Standard (for Transmission Measurements)

Be sure that an aperture plate with a white ring is being used. Place the sample clamp inside instrument. Place the transmission plaque over the aperture plate. Select the "Instrument" tab. Click on "Create Standard". Select "Take a measurement using the attached instrument" and hit "Next". Select if you want an average of measurements and indicate the number of measurements taken. Example: three measurements are taken for an average. Place a 2×2 sample in the transmission sample clamp. Close the transmission cover by lifting up on the locking pin while sliding the cover to the front. Click on "Measure" and repeat for each sample. Click "Next." Type in a name for the standard. Type in a description for the standard if you choose. Click "Next." If you want to change the tolerance or the Illuminant/Observer specifications, click on "Modify" and make the desired changes. Otherwise, select "Next." Select "No" when prompted to enter in shade sorting data and select "Next." Select "Finish".

Selecting a Standard (for Transmission Measurements)

Select the "Database" tab. Click on "Find Standard". Click the appropriate standard needed. Standard should be highlighted in blue. Then press "Select". Standard is ready to use. To double check the right standard was selected, check the control box in the upper left-hand corner in the program. This box should read the appropriate standard selected.

Measuring Samples (for Transmission)

Mount the appropriate aperture plate (with white reflective ring) to the measurement port at the front of the instrument. Place the white cap over the aperture plate. Attach the sample clamp and stop to the base with the thumb screws. Select the "Instrument" tab. Click on "Measure Trial." In the bottom left-hand side of the screen, a window will pop up with the name of the standard being used. Move this window up so that it can be seen on the screen. Change the specifications as needed, such as displaying SPIN (specular reflectance included) or SPEX (specular reflectance excluded) measurements and the illuminant/observer specification. Change the configuration to match picture below by click the hyperlink under "Haze". Next to "Lot I.D." type in the sample name for the sample that is being measured. Center the 2 in×2 in sample in the transmission sample holder and place between the stop and clamp toward the sphere. Always make certain that the sample is flush and parallel to the opening in the sphere. Close the cover. Hit F8 on the keyboard or click on the right corner of "Measure" to make the measurement. You should hear a clicking noise and see a flash when measuring. Once the measurement is complete, remove the sample from the sample holder. If there is another sample, place it onto the sample holder. Continue until all samples have been measured. Wait approximately 1 minute between sample measurements. Once measurements are complete, exit out of the "Measure Trial" window.

Reporting of Test Results

The numerical data that is given is in terms of the CIE L*a*b* color measurement system. These values represent various aspects of an object's color. The L value quantifies how light or dark the color is, with black and white being the two ends. The a value quantifies how red or green the color is, with a positive a value being more red and a negative a value being more green. The b value quantifies how yellow or blue the color is, with a positive b value being more yellow and a negative b value being more blue. Record the Spex numerical data that is given of the L*a*b* color measurements under F12/10 light source.

The foregoing description is given for clearness of understanding only, and no unnecessary limitations should be understood therefrom, as modifications within the scope of the invention may be apparent to those having ordinary skill in the art.

All patents, publications and references cited herein are hereby fully incorporated by reference. In case of conflict between the present disclosure and incorporated patents, publications and references, the present disclosure should control.

EXAMPLES

The water soluble films of the Examples were prepared and exposed to a TCCA or SBS in secondary packaging prepared from a 4 mil HDPE film. The films were stored in contact with the harsh chemical for 6-8 weeks at a temperature of 38° C. and 80% RH. The dissolution, disintegration, and/or % residue were measured according to MSTM 205, the yellowness was measured according to CIELab Test, and the elongation % was measured according to the Elongation Test.

Dissolution: Each sample was measured at 0 weeks, 2 weeks, 4 weeks, 6 weeks, and in some cases, 8 weeks, time points unless the films failed to dissolve at which point that film was discontinued from testing. A shorter dissolution time and/or lower amount of film residue indicated that the resin is more stable to the harsh chemical, and a longer dissolution time and/or increased amount of residue at 6 or 8 weeks indicated the film is more effected by the harsh chemical.

The water-soluble films were prepared using various maleate modified PVOH, methyl acrylate modified PVOH, and PVOH homopolymers as the sole resin component to determine the effect of the harsh chemical on the PVOH alone. It was found that in general, maleate modified PVOHs were more stable than methyl acrylate modified PVOHs, which were more stable than PVOH homopolymers. Additionally, it was found that for polymers that can form lactone rings, the films including polymers having the lactone rings open had better dissolution/disintegration times than the corresponding films wherein the polymers include some degree of closed rings.

Example 1

Figure 2:
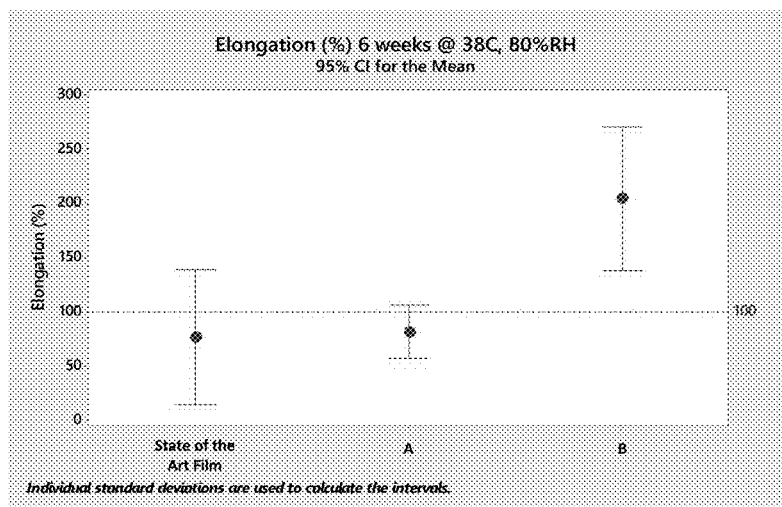
FIG. 2 is a chart of elongation values (%) for various films after being exposed to a harsh chemical for 6 weeks in a 38° C. and 80% relative humidity (RH) atmosphere.
Figure 3:
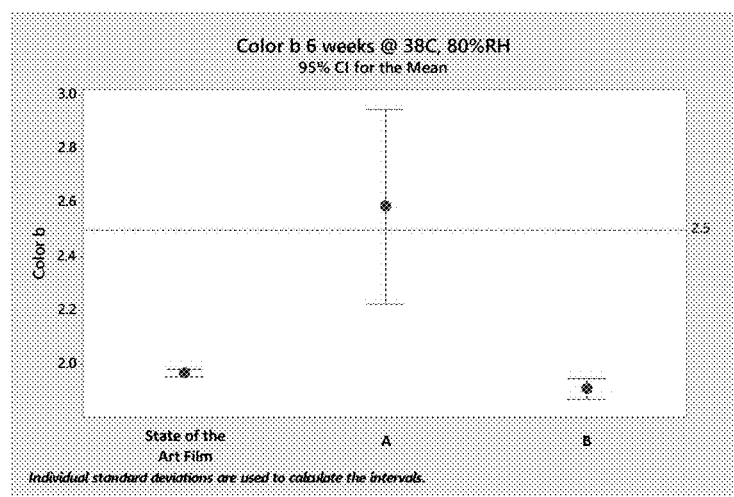
FIG. 3 is a chart of b* for various films after being exposed to a harsh chemical for 6 weeks in a 38° C. and 80% relative humidity (RH) atmosphere.

Three water soluble films were tested for dissolution, elongation % and discoloration according to MSTM 205 (dissolution), the Elongation Test Method and the CIELab Test (discoloration). The results of the tests are shown in FIGS. 1-3. The first film tested was a state of the art film used for packaging pool chemicals commercially, as a comparative water soluble film. Two water soluble films were prepared. Film A included a 1.7 mol % monomethyl maleate modified polyvinyl alcohol (100 parts), 10 parts per 100 parts PVOH of plasticizer (glycerol and maltitol) and did not include polyvinylpyrrolidone. Film B included a 1.7% monomethyl maleate modified PVOH resin (100 parts), a polyvinylpyrrolidone resin (29.3 parts per 100 parts PVOH), and 13.2 parts per 100 parts PVOH of plasticizer (6.6 parts glycerin and 6.6 parts trimethylolpropane). The three films were stored in contact with the harsh chemical (i.e., sodium bisulfate) for 6 weeks at a temperature of 38° C. and 80% RH prior to testing for dissolution, discoloration, and elongation. As shown in FIGS. 1-3, the film of the disclosure, Film B, performed better than Film A in all tests. After 6 weeks at a temperature of 38° C. and 80% RH in contact with a harsh chemical, Film B, had a lower dissolution time than Film A by at least 200 seconds, a higher elongation percentage than Film A by at least 100%, and a lower discoloration than Film A (b* of less than 2.0 and 2.5, respectively). Further, Film B performed better than the state of the art film in elongation percent (by over 100%) and had a lower b* value after being in contact with the harsh chemical for 6 weeks at a temperature of 38° C. and 80% RH.

Accordingly, Example 1 demonstrates that films of the disclosure demonstrate increased resistance to sodium bisulfate, relative to commercially available films and films that do not include PVP.

Example 2

A series of films were prepared including a 1.7% monomethyl maleate modified PVOH resin, a polyvinylpyrrolidone resin, and glycerol as a plasticizer. The amounts of each resin and glycerol for each film is provided in Table 1, below.

Each film was stored in contact with the harsh chemical for 8 weeks at a temperature of 38° C. and 80% RH prior to testing for dissolution, discoloration, and elongation according to the methods of the disclosure. The results are shown in Table 1, below. Residue values of 25% or less are indicated with a "+" and residue values of greater than 25% are indicated with a "−". Elongation values of 100% or more are indicated with a "+" and elongation values of less than 100% are indicated with a "−". b* values of 2.5 or less are indicated with a "+", b* values greater than 2.5 are indicated with a "−".

TABLE 1

| Film | PVP (wt. %) | PVOH (wt. %) | Ratio of PVOH:PVP | Glycerol (wt. %) | Elongation | Residue | b* |
|---|---|---|---|---|---|---|---|
| C | 26.58 | 62.94 | 2.36:1 | 10.48 | + | + | − |
| D | 59.53 | 26.20 | 0.44:1 | 14.27 | − | − | − |
| E | 26.20 | 62.94 | 2.40:1 | 10.86 | + | + | + |
| F | 8.33 | 75.00 | 9:1 | 16.67 | − | − | − |
| G | 81.82 | 9.09 | 0.11:1 | 9.09 | − | − | + |
| H | 9.09 | 81.82 | 9:1 | 9.09 | + | + | − |
| I | 62.94 | 26.58 | 0.42:1 | 10.48 | − | − | + |
| J | 62.94 | 26.20 | 0.42:1 | 10.86 | − | − | + |
| K | 81.82 | 8.33 | 0.10:1 | 9.85 | − | − | + |
| L | 26.20 | 59.53 | 2.27:1 | 14.27 | − | − | − |
| M | 44.07 | 44.07 | 1:1 | 11.87 | + | − | − |
| N | 8.33 | 81.82 | 9.8:1 | 9.85 | + | + | + |
| O | 75.00 | 8.33 | 0.11:1 | 16.67 | − | − | + |

As shown in Table 1, films including the PVOH and the PVP in a PVOH to PVP weight ratio of at least 2.3:1 and glycerol in an amount of 15 wt. % or less advantageously demonstrate acceptable values in at least two of the three tests. Thus, Example 2 demonstrates films of the disclosure having resistance to harsh chemicals.

Example 3

Table 2 shows film formulations of the disclosure with varying amounts of plasticizers.

TABLE 2

| Film | PVP (K120) (wt %) | PVOH (wt %) | Glycerol (wt %) | Voranol 230-660 (wt %) | TMP (wt %) | Maltitol (wt %) |
|---|---|---|---|---|---|---|
| P | 20.6 | 70.2 | 1.15 | 1.15 | 1.15 | 5.75 |
| Q | 20.6 | 70.2 | 1.15 | 1.15 | 5.75 | 1.15 |
| R | 20.6 | 70.2 | 1.15 | 5.75 | 1.15 | 1.15 |
| S | 20.6 | 70.2 | 5.75 | 1.15 | 1.15 | 1.15 |
| T | 20.6 | 70.2 | 2.3 | 2.3 | 2.3 | 2.3 |
| U | 20.6 | 70.2 | 0 | 0 | 0 | 9.2 |
| V | 20.6 | 70.2 | 0 | 0 | 9.2 | 0 |
| W | 20.6 | 70.2 | 0 | 9.2 | 0 | 0 |
| X | 20.6 | 70.2 | 9.2 | 0 | 0 | 0 |
| Y | 20.6 | 70.2 | 0 | 0 | 4.6 | 4.6 |
| Z | 20.6 | 70.2 | 0 | 4.6 | 0 | 4.6 |
| AA | 20.6 | 70.2 | 0 | 4.6 | 4.6 | 0 |
| BB | 20.6 | 70.2 | 4.6 | 0 | 0 | 4.6 |

TABLE 2-continued

| Film | PVP (K120) (wt %) | PVOH (wt %) | Glycerol (wt %) | Voranol 230-660 (wt %) | TMP (wt %) | Maltitol (wt %) |
|---|---|---|---|---|---|---|
| B | 20.6 | 70.2 | 4.6 | 0 | 4.6 | 0 |
| DD | 20.6 | 70.2 | 4.6 | 4.6 | 0 | 0 |
| EE | 20.6 | 70.2 | 0 | 3.07 | 3.07 | 3.07 |
| FF | 20.6 | 70.2 | 3.07 | 0 | 3.07 | 3.07 |
| GG | 20.6 | 70.2 | 3.07 | 3.07 | 0 | 3.07 |
| HH | 20.6 | 70.2 | 3.07 | 3.07 | 3.07 | 0 |

Figure 4:
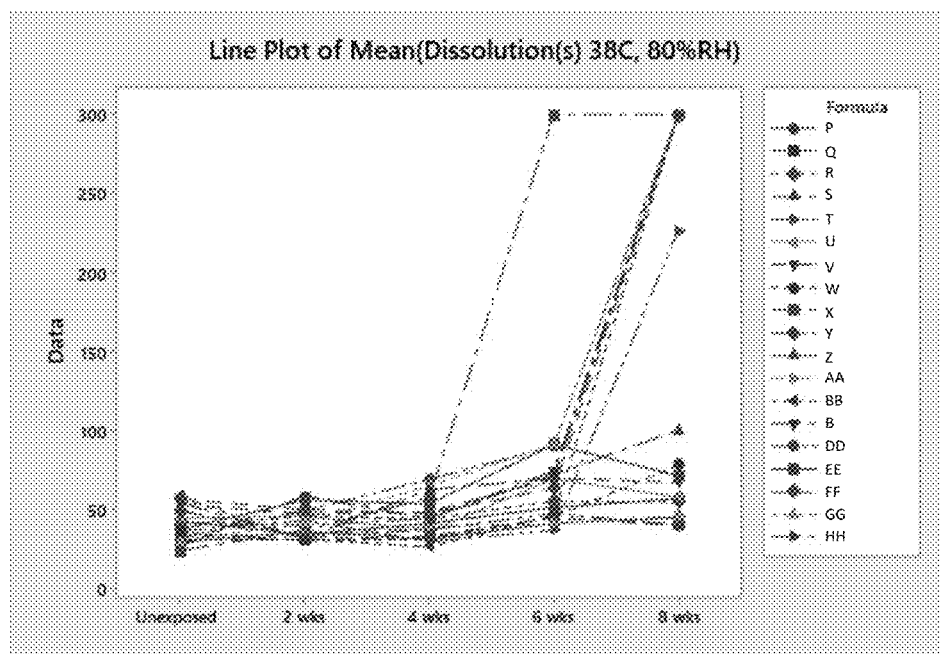
FIG. 4 is a line plot of dissolution time(s) over time for various films after being exposed to a harsh chemical in a 38° C. and 80% relative humidity (RH) atmosphere.
Figure 5:
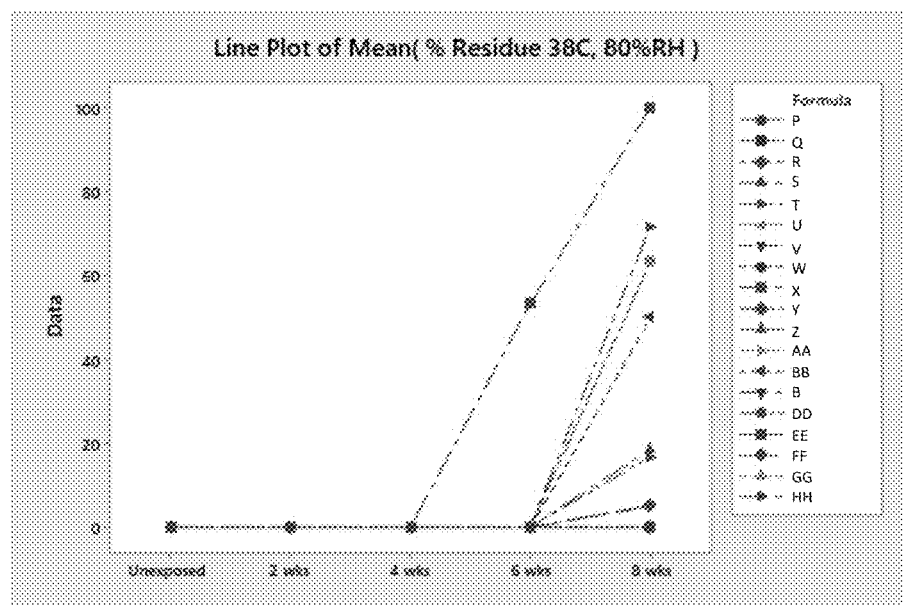
FIG. 5 is a line plot of residue values (%) over time for various films after being exposed to a harsh chemical in a 38° C. and 80% relative humidity (RH) atmosphere.
Figure 6:
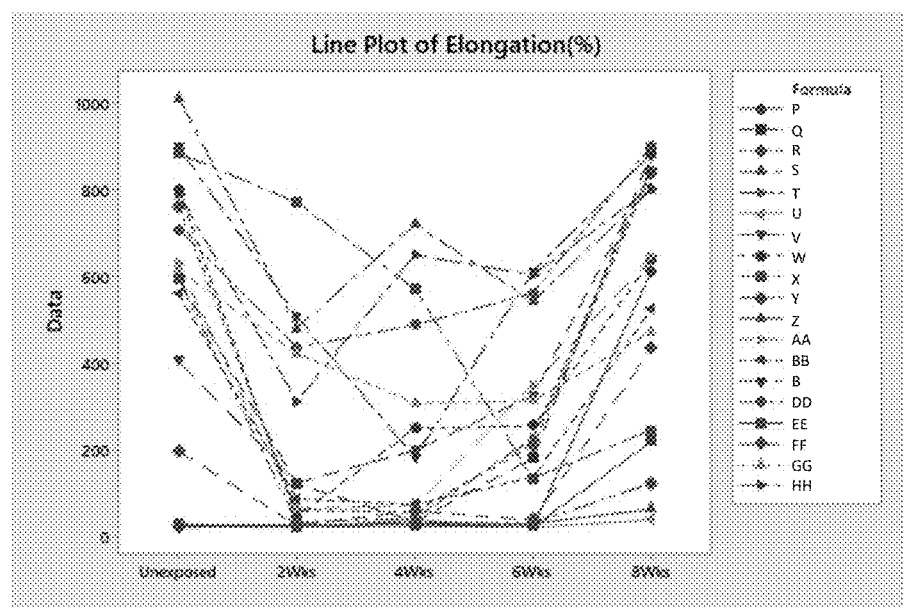
FIG. 6 is a line plot of elongation values (%) over time for various films after being exposed to a harsh chemical in a 38° C. and 80% relative humidity (RH) atmosphere.

The PVOH resin used in the films of Table 2 was a 1.7% monomethyl maleate modified PVOH resin. The results shown in FIGS. 4-6 demonstrate that plasticizer selection can affect the performance of the film when exposed to harsh chemicals. FIG. 4 is a graph showing the dissolution of the films having the formulations listed Table 2 according to the Dissolution, Disintegration, and % Residue Test (MSTM 205) after exposure to SBS composition for 8 weeks in a 38° C. and 80% RH atmosphere. The films were tested at time points T=0, after 2 weeks, 4 weeks, 6 weeks, and 8 weeks of exposure to the harsh chemical. FIG. 5 is a graph showing the % residue of the films having the formulations listed Table 2 according to the Dissolution, Disintegration, and % Residue Test (MSTM 205) after exposure to a SBS composition for 8 weeks in a 38° C. and 80% RH atmosphere. The films were tested at time points T=0, after 2 weeks, 4 weeks, 6 weeks, and 8 weeks of exposure to the harsh chemical. FIG. 6 is a graph showing the elongation % of the films having the formulations listed Table 2 according to the Dissolution, Disintegration, and % Residue Test (MSTM 205) after exposure to a SBS composition for 8 weeks in a 38° C. and 80% RH atmosphere. The films were tested at time points T=0, after 2 weeks, 4 weeks, 6 weeks, and 8 weeks of exposure to the harsh chemical.

As shown in FIGS. 4-6, all films including any of glycerol, maltitol, Voranol™, TMP, or a combination thereof, all demonstrated acceptable dissolution time (less than 300 seconds according to MSTM 205), acceptable residue properties (less than 25% residue), and acceptable resistance to coloration (b* value less than 3.5 according to the CIELab Test), and acceptable elongation % (greater than 100% according to the Elongation Test). Film EE demonstrated the best performance overall for compatibility with harsh chemicals, based on a balance between acceptable plasticization of the film (elongation) and resistance to the harsh chemical (dissolution and coloration).

Accordingly, Example 3 demonstrates films of the disclosure having stability to harsh chemicals.

Example 4

Table 3 shows various films including a 1.7 mol % modified PVOH resin and varying amounts of antioxidants (e.g., sodium metabisulfite, propyl gallate and/or gallic acid).

TABLE 3

| Film | PVOH (PHR) | Starch filler (PHR) | Glycerol (PHR) | Maltitol (PHR) | Surfactant and process aids (PHR) | Sodium metabisulfite (SMBS)(PHR) | Propyl Gallate (PHR) | Gallic Acid (PHR) |
|---|---|---|---|---|---|---|---|---|
| II | 100 | 2.66 | 3.34 | 6.66 | 0.83 | 0 | 0.000 | 0.00 |
| JJ | 100 | 2.66 | 3.34 | 6.66 | 0.83 | 5.12 | 0.000 | 1.00 |
| KK | 100 | 2.66 | 3.34 | 6.66 | 0.83 | 4.12 | 1.00 | 1.00 |
| LL | 100 | 2.66 | 3.34 | 6.66 | 0.83 | 5.12 | 1.00 | 0.00 |
| MM | 100 | 2.66 | 3.34 | 6.66 | 0.83 | 3.12 | 1.00 | 2.00 |
| NN | 100 | 2.66 | 3.34 | 6.66 | 0.83 | 4.12 | 2.00 | 0.00 |
| OO | 100 | 2.66 | 3.34 | 6.66 | 0.83 | 6.12 | 0.00 | 0.00 |
| PP | 100 | 2.66 | 3.34 | 6.66 | 0.83 | 3.12 | 2.00 | 1.00 |
| QQ | 100 | 2.66 | 3.34 | 6.66 | 0.83 | 4.12 | 0.00 | 2.00 |
| RR | 100 | 2.66 | 3.34 | 6.66 | 0.83 | 3.62 | 2.00 | 0.50 |
| SS | 100 | 2.66 | 3.34 | 6.66 | 0.83 | 3.62 | 0.50 | 2.00 |
| TT | 100 | 2.66 | 3.34 | 6.66 | 0.83 | 5.12 | 0.50 | 0.50 |
| UU | 100 | 2.66 | 3.34 | 6.66 | 0.83 | 3.12 | 0.00 | 3.00 |
| VV | 100 | 2.66 | 3.34 | 6.66 | 0.83 | 3.12 | 3.00 | 0.00 |

All the films in Table 3 were exposed to a harsh chemical (TCCA) for 8 weeks in a 38° C. and 80% RH atmosphere. The films were tested at time points T=0, after 2 weeks, 4 weeks, 6 weeks, and 8 weeks of exposure to the harsh chemical. Film SS, which included SMBS, propyl gallate and gallic acid antioxidants, demonstrated the best stability to the harsh chemical with respect to solubility, residue, elongation, and discoloration after 8 weeks. The initial and 8 week results are shown in Table 4, below. Dissolution times of 300 seconds or less are indicated with a "+" and dissolution times greater than 300 seconds are indicated with a "−". Residue values of 50% or less are indicated with a "+" and residue values of greater than 50% are indicated with a "−". Elongation values of 100% or more are indicated with a "+" and elongation values of less than 100% are indicated with a "−". b* values of 2.5 or less are indicated with a "+", b* values between 2.5 and 5.0 are indicated with a "*", and b* values greater than 5.0 are indicated with a "−". Tests not performed are indicated with "NT."

TABLE 4

| Film[1] | Dissolution t = 0 | Dissolution 8 wk | Residue t = 0 | Residue 8 wk | Elongation t = 0 | Elongation 8 wk | b* t = 0 | b* 8 wk |
|---|---|---|---|---|---|---|---|---|
| JJ | + | − | + | NT | + | NT | + | NT |
| KK | + | + | + | − | + | + | + | * |
| LL | + | − | + | NT | + | NT | + | NT |
| MM | + | − | + | NT | + | NT | + | NT |
| NN | + | − | + | NT | + | NT | + | NT |
| OO | + | − | + | NT | + | NT | + | NT |
| PP | + | + | + | − | − | + | + | * |
| QQ | + | + | + | − | + | + | + | * |
| RR | + | − | + | NT | + | NT | + | NT |
| SS | + | + | + | + | + | + | + | * |
| TT | + | − | + | NT | + | NT | + | NT |
| UU | + | + | + | NT | − | + | + | * |
| VV | + | − | + | − | − | NT | + | NT |
| II | + | + | + | − | + | + | + | + |

Table 5 below shows various formulations including a 1.7 mol % modified PVOH film and varying amounts of acid scavenger (e.g., monoethanolamine).

TABLE 5

| Film | PVOH (PHR) | Starch filler (PHR) | Glycerin (PHR) | Maltitol (PHR) | SMBS (PHR) | Surfactant and process aids (PHR) | Monoethanolamine (PHR) |
|---|---|---|---|---|---|---|---|
| XX | 100 | 2.66 | 3.34 | 6.66 | 3 | 0.83 | 0 |
| YY | 100 | 2.66 | 3.34 | 6.66 | 3 | 0.83 | 0.5 |
| ZZ | 100 | 2.66 | 3.34 | 6.66 | 3 | 0.83 | 1 |

All the films in Table 5 were exposed to a harsh chemical (sodium bisulfate) for 8 weeks in a 38° C. and 80% RH atmosphere. The films were tested at time points T=0, after 2 weeks, 4 weeks, 6 weeks, and 8 weeks of exposure to the harsh chemical. The films were tested for dissolution/residue, discoloration, and elongation % using the methods disclosed herein.

After 8 weeks, Films YY and ZZ, which included the acid scavenger monoethanolamine, demonstrated improved performance relative to the film that did not (Film XX). All three films had residue values of less than 25% after 8 weeks and dissolution times of less than 100 seconds after 8 weeks. However, Films YY and ZZ had b* values of less than 2.5 after 8 weeks, while Film XX had a b* value greater than 2.5 after 8 weeks. Additionally, Films YY and ZZ had elongation % values of greater than 100% after 8 weeks, while Film XX had an elongation % value of less than 100% after 8 weeks.

Thus, Example 4 demonstrated that the resistance of PVOH to harsh chemicals can be improved by including antioxidants and/or acid scavengers in the film formulation. For example, Film SS, which included SMBS, propyl gallate and gallic acid antioxidants, demonstrated the best stability to the harsh chemical with respect to solubility, residue, elongation, and discoloration after 8 weeks compared to films with only one or two of the antioxidants added (e.g., Films LL, NN, OO, and VV).

Example 5

A film containing 100 PHR of 1.7 mol % monomethyl maleate modified PVOH resin, 14.67 PHR of K-120 polyvinylpyrrolidone, 6.55 PHR glycerol, 6.55 PHR trimethylolpropane (TMP), 3.94 PHR sodium metabisulfite, 2.18 PHR gallic acid, and 0.83 PHR surfactants and other process aids exhibited acceptable performance when in contact with a harsh chemical (e.g., sodium bisulfate) for 8 weeks at a temperature of 38° C. and 80% RH.

After 8 weeks, the film including the antioxidant (i.e., sodium metabisulfite and gallic acid) displayed acceptable performance in dissolution dissolution/residue % (e.g., the film dissolves in less than 300 seconds according to MSTM 205 and leaves less than 25% residue), acceptable discoloration (e.g., the film had a color b* value of less than 3.0 according to the CIELab Test), and improved elongation % (e.g., the film had greater than 100% elongation).

Thus, Example 5 demonstrates films of the disclosure having stability to harsh chemicals.

The foregoing description is given for clearness of understanding only, and no unnecessary limitations should be understood therefrom, as modifications within the scope of the invention may be apparent to those having ordinary skill in the art.

All patents, publications and references cited herein are hereby fully incorporated by reference. In case of conflict between the present disclosure and incorporated patents, publications and references, the present disclosure should control.

What is claimed:

1. A water soluble film comprising:
    a water soluble mixture of a polyvinyl alcohol (PVOH) and a polyvinylpyrrolidone (PVP),
    wherein the PVOH and the PVP are present in a ratio of about 3:1 by weight to about 19:1 by weight, respectively, and the PVOH comprises an 2-acrylamide-2-methylpropanesulfonic acid (AMPS) modified PVOH or a maleate modified PVOH,
    wherein the PVP has a weight average molecular weight in the range of 500,000 g/mol to 4 million g/mol,
    wherein the PVOH has a degree of modification in a range of about 1.5 mol % to about 4 mol %, and
    wherein the water soluble film defines an interior pouch volume containing within the interior pouch a composition that is one or more of a hypochlorite, calcium hypochlorite, hypochlorous acid, a halogenated isocyanurate, a chlorate, a chlorite, a perchlorate, a bromate, a perbromate, a halogenated hydantoin, a perborate, a periodate, a persulfate, a permanganate, a chromate, a dichromate, a nitrate, a nitrite, a peroxide, a ketone peroxide, a peroxy acid, citric acid, muriatic acid, and an inorganic acid that is one or more of sodium bisulfate (SBS), cyanuric acid, dichloroisocyanuric acid, and trichloroisocyanuric acid (TCCA).

2. The water soluble film of claim 1, wherein the maleate modified PVOH comprises maleate monomer units having about 2 pendant carboxylate groups per maleate monomer unit, or about 1.5 pendant carboxylate groups per maleate monomer unit, or about 1 pendant carboxylate group per maleate monomer unit.

3. The water soluble film of claim 1, wherein the PVOH has a degree of hydrolysis in a range of 80% to 98%.

4. The water soluble film of claim 1, further comprising an acid scavenger.

5. The water soluble film of claim 4, wherein the acid scavenger is one or more selected from the group of N-vinyl pyrrolidone, sodium metabisulfite, an activated olefin, an allylic compound, an ethylene containing compound, a quaternary ammonium compound, and a tertiary amine containing compound.

6. The water soluble film of claim 1, further comprising an antioxidant.

7. The water soluble film of claim 6, wherein the antioxidant is one or more selected from the group of propyl gallate, citric acid, gallic acid, a phenolic compound, a hindered amine, sodium metabisulfite, and zinc acetate.

8. The water soluble film of claim 1, further comprising one or more acid scavenger and one or more antioxidant.

9. The water soluble film of claim 8, wherein the one or more acid scavenger comprises sodium metabisulfite and the one or more antioxidant comprises propyl gallate and gallic acid.

10. The water soluble film of claim 1, further comprising a plasticizer.

11. The water soluble film of claim 10, wherein the plasticizer is one or more selected from the group of glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, a polyether polyol, 2-methyl-1,3-propanediol, an ethanolamine, and maltitol.

12. The water soluble film of claim 10, wherein the plasticizer is one or more selected from the group of glycerol, maltitol, and trimethylolpropane.

13. The water soluble film of claim 1, further comprising a surfactant.

14. The water soluble film of claim 13, wherein the surfactant comprises one or more of a quaternary ammonium salt and a quaternized polyoxyethylenated amine.

15. The water soluble film of claim 1, wherein the water soluble film has a thickness in a range of 25 μm to 100 μm.

16. The water soluble film of claim 1, wherein the water soluble mixture further comprises one or more second polyvinyl alcohol selected from the group of a PVOH homopolymer and a PVOH copolymer.

17. The water soluble film of claim 16, wherein the second PVOH is a PVOH copolymer comprising an anionic monomer unit.

18. The water soluble film of claim 17, wherein the anionic monomer unit is one or more selected from the group of vinyl acetic acid, maleic acid, monoalkyl maleate, dialkyl maleate, monomethyl maleate (MMM), dimethyl maleate, maleic anhydride, fumaric acid, monoalkyl fumarate, dialkyl fumarate, monomethyl fumarate, dimethyl fumarate, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid (AMPS), 2-sulfoethyl acrylate, hydrolyzed N-vinylpyrrolidone (NVP), an alkali metal salt of any the foregoing, and an ester of any of the foregoing.

19. The water soluble film of claim 17, wherein the anionic monomer unit is one or more selected from the group of AMPS, hydrolyzed NVP, maleic anhydride, monomethyl maleate, and an alkali salt of the foregoing.

20. The water soluble film of claim 17, wherein the anionic monomer unit is one or more selected from the group of monomethyl maleate, maleic anhydride, and an alkali salt of the foregoing.

21. A water soluble film comprising:
 a water soluble mixture of: a maleate modified polyvinyl alcohol (PVOH), a polyvinylpyrrolidone (PVP), a plasticizer, and an antioxidant,
 wherein the maleate modified PVOH and the PVP are present in a weight ratio of about 6.5:1 to about 7.5:1, respectively, the maleate modified PVOH comprises a maleate monomer unit present in an amount of about 1.8 mol %, the maleate modified PVOH comprises about 2 pendant carboxylate groups per maleate monomer unit, the polyvinylpyrrolidone PVP has a weight average molecular weight in a range of 1.2 million g/mol to 3 million g/mol, the plasticizer comprises about 2 PHR to about 10 PHR glycerin and about 2 PHR to about 10 PHR trimethylolpropane, the antioxidant comprises gallic acid and sodium metabisulfite, and a total amount of the antioxidant present is about 2 PHR to about 7 PHR, and
 wherein the water soluble film defines an interior pouch volume containing within the interior pouch a composition that is one or more of a hypochlorite, calcium hypochlorite, hypochlorous acid, a halogenated isocyanurate, a chlorate, a chlorite, a perchlorate, a bromate, a per bromate, a halogenated hydantoin, a perborate, a periodate, a persulfate, a permanganate, a chromate, a dichromate, a nitrate, a nitrite, a peroxide, a ketone peroxide, a peroxy acid, citric acid, muriatic acid, and an inorganic acid that is one or more of sodium bisulfate (SBS), cyanuric acid, dichloroisocyanuric acid, and trichloroisocyanuric acid (TCCA).

22. The water soluble film of claim 1, wherein the film has a disintegration time of no more than 300 seconds according to MSTM 205 in 23° C. water after exposure to trichloroisocyanuric acid (TCCA) or sodium bisulfate (SBS) for 8 weeks in a 38° C. and 80% RH atmosphere.

23. The water soluble film of claim 22, wherein a surface area of a residue of the film after testing according to MSTM 205 is less than about 50% of the surface area of the film prior to testing according to MSTM 205.

24. The water soluble film of claim 1, wherein the film maintains a b* value of no more than 3.5 after exposure to TCCA or SBS for 8 weeks in a 38° C. and 80% RH atmosphere.

25. The water soluble film of claim 1, wherein the film maintains an average elongation of at least 90% after exposure to TCCA or SBS for 8 weeks in a 38° C. and 80% RH atmosphere.

* * * * *